US012449404B2

(12) United States Patent
Wang et al.

(10) Patent No.: US 12,449,404 B2
(45) Date of Patent: Oct. 21, 2025

(54) ULTRASONIC PATCH TRANSDUCER FOR MONITORING THE CONDITION OF A STRUCTURAL ASSET

(71) Applicant: Molex, LLC, Lisle, IL (US)

(72) Inventors: Ke Wang, Naperville, IL (US); Alexander S. Chernyshov, Satellite Beach, FL (US); Mariusz Kloza, Orlando, FL (US); Sascha Schieke, Geneva, IL (US); Dumitru Rosca, Naperville, IL (US)

(73) Assignee: Molex, LLC, Lisle, IL (US)

( * ) Notice: Subject to any disclaimer, the term of this patent is extended or adjusted under 35 U.S.C. 154(b) by 316 days.

(21) Appl. No.: 17/771,762

(22) PCT Filed: Oct. 23, 2020

(86) PCT No.: PCT/US2020/057025
§ 371 (c)(1),
(2) Date: Apr. 25, 2022

(87) PCT Pub. No.: WO2021/081307
PCT Pub. Date: Apr. 29, 2021

(65) Prior Publication Data
US 2022/0373515 A1    Nov. 24, 2022

Related U.S. Application Data

(60) Provisional application No. 62/925,885, filed on Oct. 25, 2019.

(51) Int. Cl.
G01N 29/22    (2006.01)
G01M 3/24    (2006.01)
(Continued)

(52) U.S. Cl.
CPC .......... *G01N 29/223* (2013.01); *G01M 3/243* (2013.01); *G01N 29/04* (2013.01);
(Continued)

(58) Field of Classification Search
CPC .. G01N 29/223; G01N 29/04; G01N 29/2475; G01N 29/326; G01N 2291/0234; G01N 2291/2634; G01M 3/243
See application file for complete search history.

(56) References Cited

U.S. PATENT DOCUMENTS 4,398,424 A * 8/1983 Abts ...................... G01N 29/28
73/632
6,527,800 B1    3/2003 Mcguckin, Jr. et al.
(Continued)

FOREIGN PATENT DOCUMENTS

CN    209446093 U * 9/2019
DE    202011003126 U1 * 6/2011 ......... G01F 23/0007
(Continued)

OTHER PUBLICATIONS

CN-209446093-U, English Translation (Year: 2019).*
(Continued)

*Primary Examiner* — Ryan D Walsh

(57) ABSTRACT

An ultrasonic patch transducer is configured to be secured to an outer surface of a structural asset, such as a pipe or pressure vessel, for condition monitoring. The ultrasonic patch transducer includes a housing defining a centerline between a first end of the housing and a second end of the housing, a piezoelectric element within the housing and positioned along the centerline, and at least two magnets within the housing and positioned along the centerline. The at least two magnets and the piezoelectric element are configured to be positioned along a tangent plane of the structural asset.

21 Claims, 22 Drawing Sheets

(51) Int. Cl.
    *G01N 29/04*     (2006.01)
    *G01N 29/24*     (2006.01)
    *G01N 29/32*     (2006.01)

(52) U.S. Cl.
    CPC ....... *G01N 29/2475* (2013.01); *G01N 29/326* (2013.01); *G01N 2291/0234* (2013.01); *G01N 2291/2634* (2013.01)

(56) References Cited

U.S. PATENT DOCUMENTS

| | | | | |
|---|---|---|---|---|
| 7,694,570 | B1 * | 4/2010 | Dam | ............... H10N 30/00 |
| | | | | 73/644 |
| 2008/0257050 | A1 | 10/2008 | Watanabe | |
| 2009/0025474 | A1 | 1/2009 | Lagergren | |
| 2010/0024559 | A1 | 2/2010 | Bossi et al. | |
| 2010/0242593 | A1 | 9/2010 | Lagergren et al. | |
| 2011/0072905 | A1 * | 3/2011 | Lam | ............... G01N 29/221 |
| | | | | 73/622 |
| 2012/0065479 | A1 | 3/2012 | Lahiji et al. | |
| 2013/0068027 | A1 * | 3/2013 | Sullivan | ............... G01N 29/07 |
| | | | | 702/56 |
| 2014/0312739 | A1 * | 10/2014 | Bar-Cohen | ............... G01N 29/223 |
| | | | | 310/336 |
| 2015/0085617 | A1 | 3/2015 | Savord | |
| 2016/0109411 | A1 | 4/2016 | Pellegrino et al. | |
| 2016/0370212 | A1 | 12/2016 | Silverman et al. | |
| 2017/0156695 | A1 * | 6/2017 | Nakamura | ............... A61B 8/4236 |
| 2018/0164258 | A1 | 6/2018 | Feydo et al. | |
| 2019/0128850 | A1 * | 5/2019 | Brignac | ............... G01B 17/02 |
| 2019/0390990 | A1 * | 12/2019 | Krywyj | ............... G01N 29/041 |

FOREIGN PATENT DOCUMENTS

| | | | | |
|---|---|---|---|---|
| EP | 0458426 | B1 | 2/1995 | |
| JP | 2001215143 | A * | 8/2001 | |
| JP | 2017099664 | A | 6/2017 | |
| KR | 101493374 | B1 | 2/2015 | |
| WO | WO-2015118326 | A1 * | 8/2015 | ............. G01D 11/30 |
| WO | 2016207604 | A1 | 12/2016 | |
| WO | WO-2018185338 | A1 * | 10/2018 | ............. G01D 11/30 |

OTHER PUBLICATIONS

DE-202011003126-U1, English Translation (Year: 2011).*
JP-2001215143-A, English Translation (Year: 2001).*
WO-2015118326-A1, English Translation (Year: 2015).*
WO-2018185338-A1, English Translation (Year: 2018).*
International Preliminary Report on Patentability received for PCT Application No. PCT/US2020/057025, mailed on May 5, 2022, 8 pages.
International Search Report and Written Opinion received for PCT Application No. PCT/US2020/057025, mailed on Feb. 2, 2021, 10 pages.
"Rightrax System The Smart Way to Monitor Wall Thickness", GE Sensing & Inspection Technologies, Retrieved from Internet URL: https://www.bergeng.com/mm5/downloads/kb/Rightrax-M2-Corrosion-Monitoring-Sensors-Brochure.pdf, on Jun. 2, 2022, 05 Pages.

* cited by examiner

ULTRASONIC PATCH TRANSDUCER FOR MONITORING THE CONDITION OF A STRUCTURAL ASSET

RELATED APPLICATIONS

This application is a national phase of PCT/US2020/057025, filed on Apr. 29, 2021, which claims priority to U.S. Provisional Application No. 62/925,885 filed on Oct. 25, 2019, which are incorporated herein by reference in their entireties.

FIELD OF THE DISCLOSURE

This disclosure relates to the field of ultrasonic transducers, more specifically to devices for ultrasonically monitoring the condition and integrity of structural assets, including pipes and pressure vessels, such as those used in the oil and gas and power generation industries.

DESCRIPTION OF RELATED ART

The use of ultrasonic transducers for ultrasonically monitoring the condition and integrity of structural assets, including pipes and pressure vessels, such as those used in the oil and gas and power generation industries is well-known. However, many of these known ultrasonic transducers have a number of disadvantages associated with them.

For instance, some known ultrasonic transducers do not allow for several of such ultrasonic transducers to be deployed as a group, e.g., along the elbow or circumference of a structural asset, such that true distributed sensing cannot be realized, as the ultrasonic transducers are not cost-effective and/or are too large in size.

Other known ultrasonic transducers require a strap to secure/position the ultrasonic transducer to the structural asset. Such strapping techniques are sometimes limiting as it may not always be feasible/easy to install such a strap around the circumference of the asset at the desired location.

Other known ultrasonic transducers are not rated/do not work well for withstanding continuous heat exposure of at least 200° C., thus limiting the application where these ultrasonic transducers can be used.

Other known ultrasonic transducers do not incorporate sensors with other functions therein, such as resistance temperature detectors (RTDs), which are important to prove the working temperature of the ultrasonic transducers, especially extreme variations in temperature, can affect such readings.

Other known ultrasonic transducers are configured such that it is difficult to properly align/position the ultrasonic transducer while attempting to secure the ultrasonic transducer to the asset. For instance, some ultrasonic transducers have configurations that cause the ultrasonic transducer to "wobble" on the outer surface of the asset as they are being secured to the asset (as there are many different shapes/sizes of assets, e.g., different diameter sizes and some ultrasonic transducers may work well on some diameters, but may not work well on other diameters).

Some known commercially sold ultrasonic transducers include: (1) the Rightrax System marketed and sold by Baker Hughes, a GE company; (2) the smartPIMS™ System (which includes transducer models XD-101, XD-201 and XD-301) marketed and sold by Sensor Networks, Inc.; and (3) the Eagle Array™ System marketed and sold by Berkeley Springs Instruments LLC.

Some known patents/patent publications relating to ultrasonic transducers include: (1) U.S. Pat. No. 6,527,800; (2) United States Patent Publication No. US 2012/0065479 A1; (3) United States Patent Publication No. US 2015/0085617 A1; (4) United States Patent Publication No. US 2016/0370212 A1; (5) United States Patent Publication No. US 2018/0164258 A1; (6) International Patent Publication No. WO 2016/207604 A1; and (7) Korean Patent No. KR 101493374 B1.

As a result of the foregoing, certain individuals would appreciate improvements in ultrasonic transducers.

BRIEF SUMMARY

According to an embodiment of the disclosure, an ultrasonic patch transducer configured to be secured to an outer surface of a structural asset, such as a pipe or a pressure vessel, includes a housing defining a centerline between a first end of the housing and a second end of the housing, a piezoelectric element within the housing and positioned along the centerline, and at least two magnets within the housing and positioned along the centerline. The at least two magnets and the piezoelectric element are configured to be positioned along a tangent plane of the structural asset.

According to an embodiment of the disclosure, an ultrasonic patch transducer configured to be secured to an outer surface of a structural asset includes a housing defining a centerline between a first end of the housing and a second end of the housing, a piezoelectric element within the housing and positioned along the centerline, a sensor within the housing and positioned along the centerline, at least two magnets within the housing and positioned along the centerline, and a printed circuit board within the housing. The piezoelectric element and the sensor are coupled with the printed circuit board. The at least two magnets, the piezoelectric element and the sensor are configured to be positioned along a tangent plane of the structural asset.

According to an embodiment of the disclosure, an ultrasonic patch transducer configured to be secured to an outer surface of a structural asset includes a housing defining a centerline between a first end of the housing and a second end of the housing, a piezoelectric element within the housing and positioned along the centerline, a sensor within the housing and positioned along the centerline, a printed circuit board within the housing, the piezoelectric element and the sensor being coupled with the printed circuit board, and a pair of mounting ears extending outwardly from the housing and extending in a direction along or parallel to the centerline. Each mounting ear is configured to be engaged by a strap which surrounds the structural asset. The piezoelectric element and the sensor are configured to be positioned along a tangent plane of the structural asset when the ultrasonic patch transducer is secured to the structural asset.

According to an embodiment of the disclosure, an alignment device is provided for properly aligning an ultrasonic patch transducer to a structural asset. The alignment device includes an elongated housing having a through-hole provided therethrough, and multiple angled lower surfaces configured to be positioned against the structural asset, and first and second magnets. The first magnet is provided on one side of the through-hole, the second magnet is provided on an opposite side of the through-hole.

According to an embodiment of the disclosure, a method is provided. The method includes providing an ultrasonic patch transducer including a housing defining a centerline between a first end of the housing and a second end of the housing, a piezoelectric element within the housing and positioned along the centerline, and at least two magnets within the housing and positioned along the centerline; applying a couplant to a bottom surface of the ultrasonic patch transducer; and positioning the housing on an outer diameter of a structural asset such that each magnet is generally aligned with an axial centerline of the structural asset.

According to an embodiment of the disclosure, another method is provided. The method includes providing an ultrasonic patch transducer including a housing defining a centerline between a first end thereof and a second end thereof, and a piezoelectric element within the housing and positioned along the centerline; providing an alignment device including a housing defining a centerline between a first end thereof and a second end thereof, the housing having a through-hole therethrough, and first and second magnets within the housing and positioned along the centerline of the alignment device; positioning the alignment device on a structural asset such that each magnet is generally aligned with an axial centerline of the structural asset; securing the alignment device on the structural asset; applying a couplant to a bottom surface of the ultrasonic patch transducer; positioning the ultrasonic patch transducer within the through-hole of the alignment device; and removing the alignment device from the structural asset.

According to an embodiment of the disclosure, another method is provided. The method includes providing an ultrasonic patch transducer including a housing defining a centerline between a first end of the housing and a second end of the housing, a piezoelectric element within the housing and positioned along the centerline, and a pair of mounting ears extending outwardly from the housing, each mounting ear extending in a direction along or parallel to the centerline; applying a couplant to a bottom surface of the ultrasonic patch transducer; positioning the housing on an outer diameter of a structural asset; and engaging first and second straps around the structural asset and with the mounting ears.

To better understand the above-described objectives, characteristics and advantages of the present disclosure, embodiments, with reference to the drawings, are provided for detailed explanations.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
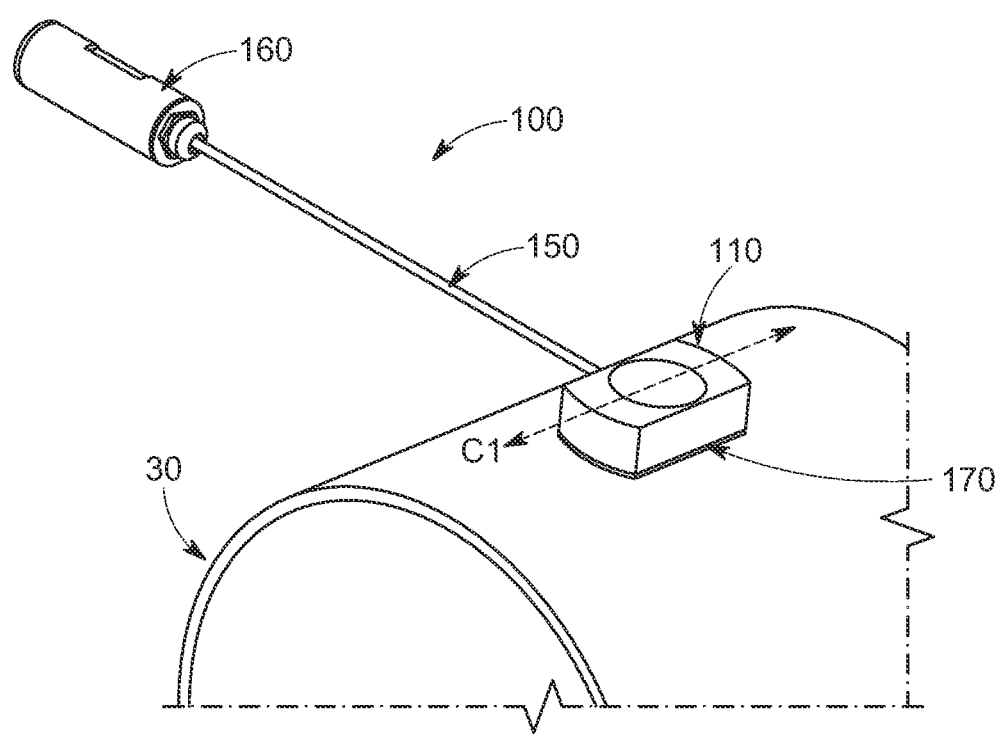
FIG. 1 illustrates a perspective view of a first embodiment of the present disclosure which provides a self-aligning ultrasonic patch transducer shown mounted on a structural asset.

While the disclosure may be susceptible to embodiment in different forms, there is shown in the drawings, and herein will be described in detail, specific embodiments with the understanding that the present disclosure is to be considered an exemplification of the principles of the disclosure, and is not intended to limit the disclosure to that as illustrated and described herein. Therefore, unless otherwise noted, features disclosed herein may be combined to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Directional terms such as front, rear, horizontal, vertical and the like are used for ease in explanation, and do not denote a required orientation in use.

Attention is directed to FIGS. 1-4 which illustrate a first embodiment of the present disclosure which provides a self-aligning ultrasonic patch transducer 100 which is designed for high temperature applications, e.g., applications of at least 200° C. (but which can also be used in lower temperature applications as well). The compact size of the ultrasonic patch transducer 100, as well as the cost-effectiveness of the ultrasonic patch transducer 100, enables the user to deploy several ultrasonic patch transducers 100 as a group, e.g., positioned along the elbow or circumference of an asset 30 (which has magnetic properties), to realize true distributed sensing. Asset 30 may be a pipe or pressure vessel, but it is to be understood that asset 30 can be a structural asset other than a pipe or a pressure vessel.

As best illustrated in FIG. 1, in a first embodiment, the ultrasonic patch transducer 100 includes a sensor assembly 110, a cable assembly 150, an ID/communication board 160, and a couplant 170.

Figure 2:
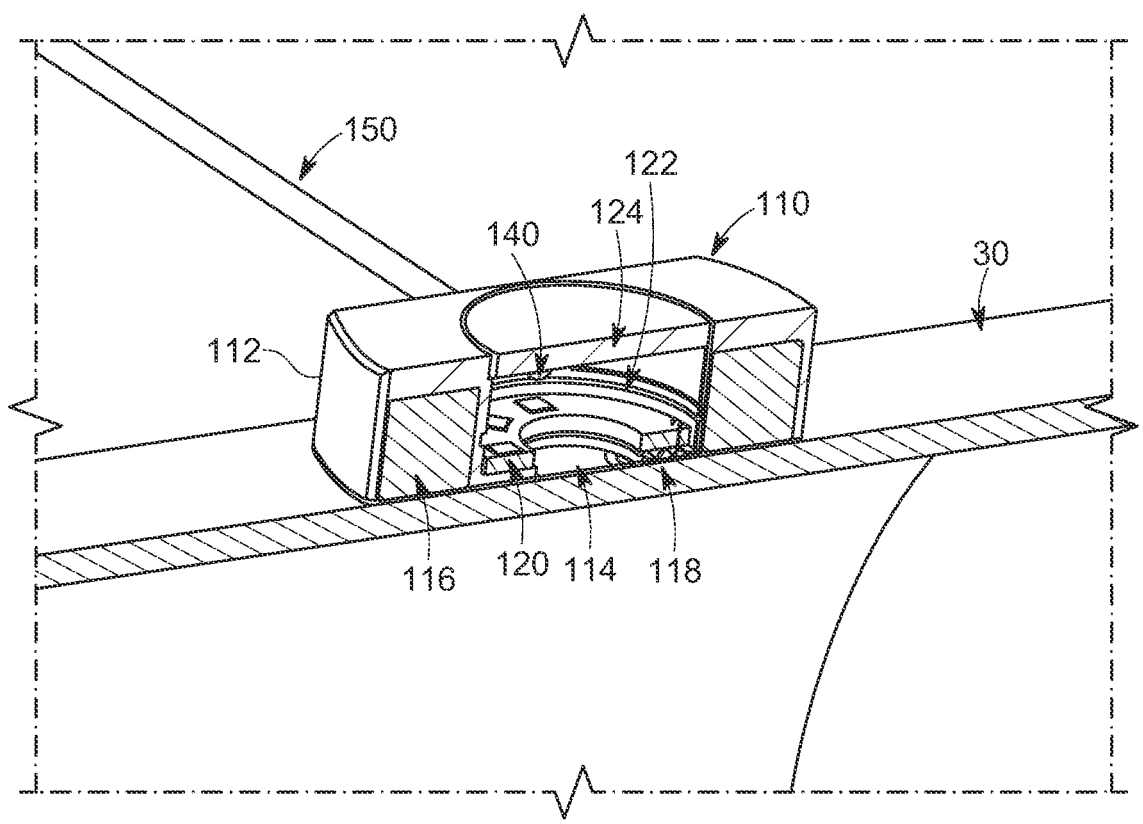
FIG. 2 illustrates a perspective cross-sectional view of the self-aligning ultrasonic patch transducer and the structural asset.
Figure 3:
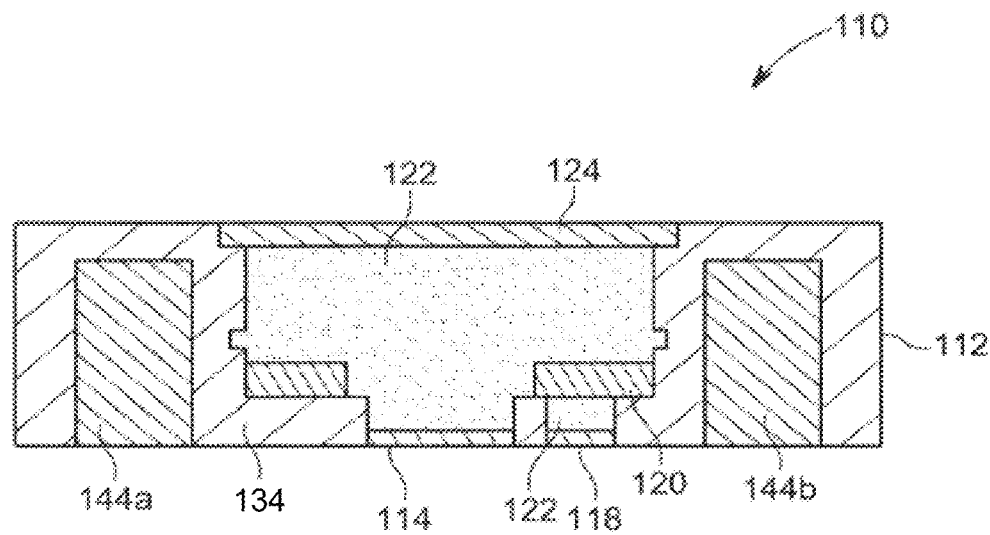
FIG. 3 illustrates a cross-sectional view of a sensor assembly of the self-aligning ultrasonic patch transducer.

As best illustrated in FIGS. 2 and 3, the sensor assembly 110 includes a housing 112, a piezoelectric element 114, a magnet assembly 116, one or more sensors 118, a printed circuit board (PCB) 120, potting material 122, and a cap 124.

Figure 4:
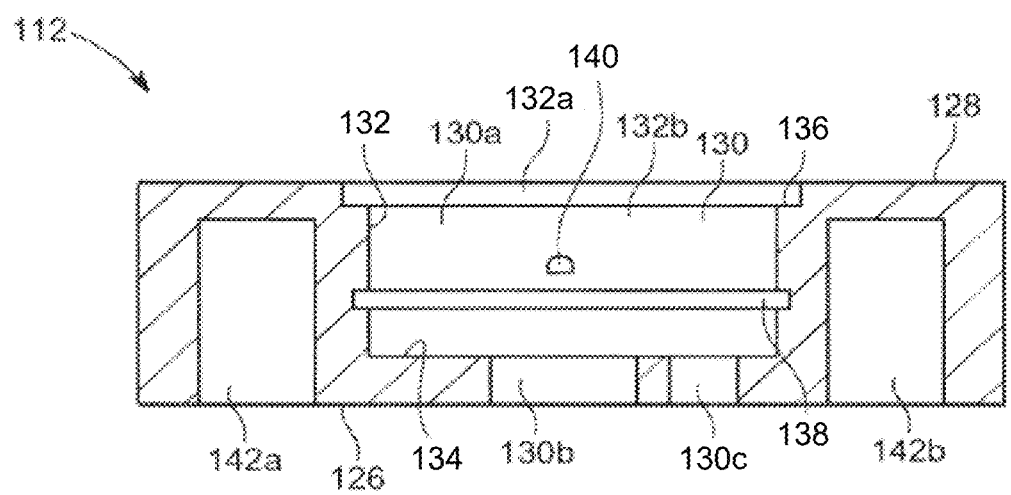
FIG. 4 illustrates a cross-sectional view of a housing of the sensor assembly.

The housing 112, as best illustrated in FIGS. 1 and 4, is preferably an elongated structure (e.g., one where a length of the housing 112 is greater in a first direction as compared to a width of the housing 112 in a second direction, which is orthogonal to the first direction). The housing 112 is preferably symmetrical about a centerline C1 (which extends in the first direction) thereof and preferably has a rectangular cross-section, which is orthogonal to the first direction. The housing 112 has a planar lower surface 126 and an upper surface 128. The housing 112 is preferably made of a rigid material, such as plastic or metal, however, the material must be able to withstand continuous heat exposure of at least 200° C., as well as outdoor exposure, e.g., exposure to temperature fluctuations, rain, snow, ice, UV exposure, etc.

The housing 112 has a through-hole 130 which extends therethrough from the lower surface 126 to the upper surface 128 (e.g., a third direction which is orthogonal to both the first and second directions). The through hole 130 preferably has an upper hole portion 130a and first and second lower hole portions 130b, 130c. The upper hole portion 130a and the first and second lower hole portions 130b, 130c may be configured in any suitable shape, but are illustrated herein as being cylindrical. The upper hole portion 130a has an upper end which is open to the upper surface 128. The first lower hole portion 130b has a lower end which is open to the lower surface 126 and an upper end that is in direct communication with a lower end of the upper hole portion 130a. The second lower hole portion 130c has a lower end which is open to the lower surface 126 and an upper end that is in direct communication with the lower end of the upper hole portion 130a. The first and second lower hole portions 130b, 130c are not in direct communication with each other. The first and second lower hole portions 130b, 130c are centered along the centerline C1.

The upper hole portion 130a is defined by a side wall 136 which extends from the upper surface 128 to a lower wall 132. The lower wall 132 may be parallel to the lower surface 126. The side wall 136 preferably has an upper wall portion and a lower wall portion. The upper wall portion has a larger diameter than the lower portion wall such that a shoulder is formed. The lower wall portion further has an undercut portion 140 which has a larger diameter than the lower wall portion. The first and second lower hole portions 130b, 130c are spaced inwardly of the side wall 136 such that the lower wall 132 forms a shoulder between the upper hole portion 130a and the first and second lower hole portions 130b, 130c.

The housing 112 further has an aperture 134 which extends through the side wall 136 and into the upper hole portion 130a via an outer side surface (not shown) of the housing 112. The housing 112 has a pair of recesses 142a, 142b, each of which has a lower end that is each open to the lower surface 126, but which are not open to the upper surface 128. The recesses 142a, 142b are centered along the centerline C1. The first and second lower hole portions 130b, 130c are preferably positioned between the recesses 142a, 142b.

The piezoelectric element 114 is configured to be positioned within the first lower hole portion 130b of the housing 112. The piezoelectric element 114 may be formed in any suitable shape, e.g., circular, rectangular, etc., but is preferably configured to match the configuration of the first lower hole portion 130b of the housing 112. The piezoelectric element 114 may be formed of any suitable material, e.g., PZT4. A lower face of the piezoelectric element 114 is configured to be generally planar with the lower surface 126 of the housing 112. The piezoelectric element 114 is centered along the centerline C1.

The magnet assembly 116 preferably includes first and second magnets 144a, 144b. The first magnet 144a is configured to be positioned and held in place within the recess 142a, and the second magnet 144b is configured to be positioned and held in place within the recess 142b. The first and second magnets 144a, 144b are centered along the centerline C1. A lower face of each magnet 144a, 144b is configured to be generally planar with the lower surface 126 of the housing 112.

Sensor 118 is preferably a resistance temperature detector (RTD) that is used for temperature compensation as sound velocity in the structural asset 30 is a function of temperature. The sensor 118 is configured to be positioned and held in place within the second lower hole portion 130c of the housing 112 to ensure good thermal contact between the structural asset 30 and the sensor 118 for accurate temperature measurements. The sensor 118 is centered along the centerline C1. A lower face of the sensor 118 is configured to be generally planar with the lower surface 126 of the housing 112. This places the sensor 118 proximate to the piezoelectric element 114.

PCB 120 is configured to be positioned and held in place within the upper hole portion 130a of the housing 112, preferably resting on the shoulder formed by the lower wall 132. The PCB 120 may have any suitable shape, but preferably has the same outer configuration as the upper hole portion 130a of the housing 112. In a preferred embodiment, the PCB 120 is ring-shaped. The PCB 120 is configured to be electrically connected to the piezoelectric element 114 and to the sensor 118. The electrical connections may be made by traditional wire-bonding technique, three-dimensional printing electrodes on plastic or via printed circuit board (PCB) board as a part of the sensor assembly 110.

Cable assembly 150 connects the sensor assembly 110 to the ID/communication board 160. The cable assembly 150 may be a single conductor cable, like coaxial cable, or multiple-conductors cable, like Power Limited Tray Cable (PLTC) or ribbon cable. The cable assembly 150 may be rigid or may be flexible/semi-rigid. A first end of the cable assembly 150 is configured to extend into the upper hole portion 130a of the housing 112 via the aperture 134 such that it can be electrically connected to the PCB 120. The cable assembly 150 may have any desired/required length.

Potting material 122 is provided within the through-hole 130 in order to hold the piezoelectric element 114, the sensor 118, the PCB 120 and the cable assembly 150 in their desired positioned within the housing 112. More specifically, potting material 122 is provided within the first lower hole portion 130b above the piezoelectric element 114, potting material 122 is provided within the second lower hole portion 130c above the sensor 118, and potting material 122 is provided within the upper hole portion 130a above the PCB 120. Depending on the configuration of the PCB 120, the potting material 122 in the upper hole portion 130a may be in contact with the potting material 122 in the first lower hole portion 130b and/or the second lower hole portion 130c (e.g., if the PCB 120 is ring-shaped, as illustrated in FIG. 2). The potting material 122 is preferably a material, such as epoxy, that is able to withstand continuous heat exposure of at least 200° C. with reasonable thermal cycling, as well as continuous outdoor exposure e.g., exposure to temperature fluctuations, rain, snow, ice, ultraviolet exposure, etc., such as high temperature epoxy or silicone. If provided, the undercut portion 140 in the housing 112 is above PCB 120 and assists in containing the potting material 122 (and thus the PCB 120) inside the through-hole 130 of the housing 112 during heating and cooling processes.

Cap 124 may be configured to be positioned within the upper hole portion 130a of the through hole 130, and positioned to rest on the shoulder of the housing 112, thereby closing off the through-hole 130 and securing the piezoelectric element 114, the sensor 118, the PCB 120 and the potting material 122 in place within the through-hole 130. The cap 124 may be secured to the housing 112 in any suitable manner, and forms part of the housing 112 once secured.

ID/Communication board 160 is configured to be electrically connected to the other end of the cable assembly 150. The ID/Communication board 160 includes ID board electronics (e.g., PCB or flex substrates), outside IP-67 rated connector, housing and cable gland.

The couplant 170 is preferably an epoxy adhesive that is able to withstand continuous heat exposure of at least 200° C. with reasonable thermal cycling, as well as continuous outdoor exposure e.g., exposure to temperature fluctuations, rain, snow, ice, UV exposure, etc. The couplant 170 is provided in a thin layer and is used to affix/secure the lower surface 126 of the housing 112 to the outer surface of the structural asset 30. The couplant 170 also adheres to the lower face of the sensor 118 and the lower face of the piezoelectric element 114, and may further adhere to the lower face of the magnets 144a, 144b, In operation, one or more ultrasonic patch transducers 100 are operatively associated with an outer surface of the structural asset 30 so as to monitor the condition/corrosion of the structural asset 30. The couplant 170 is applied to the lower surface of the sensor assembly 110, and the sensor assembly 110 is then positioned in a lengthwise direction along a length of the structural asset 30 such that each of the magnets 144a, 144b are both positioned along a tangent plane of the structural asset 30, and the piezoelectric element 114 and the one or more sensors 118 are flush with the surface of the structural asset 30. As the magnets 144a, 144b are both positioned along a tangent plane of the structural asset 30, the piezoelectric element 114 and the sensor 118 are also positioned along the tangent plane of the structural asset 30, thus causing the ultrasonic patch transducer to self-align on the structural asset 30. If more than one ultrasonic patch transducer 100 is operatively associated with the outer surface of the structural asset 30, it is preferable that each ultrasonic patch transducer 100 be provided/positioned along different tangent planes of the structural asset 30, as illustrated in FIG. 5.

The elongated configuration of the housing 112, along with the piezoelectric element 114, the magnet assembly 116 and the sensor 118 all being in line with each other along the centerline C1 of the housing 112, aids in proper alignment of the ultrasonic patch transducer 100 along a length of the structural asset 30 as there will not be any "wobble" as is experienced when ultrasonic transducers having other configurations, e.g., circular, which then include circular/ring magnets, are provided along an outer surface of the structural asset 30. Further, as the proper alignment ensures the close contact between the piezoelectric element 114 and the structural asset 30, and as the sensor 118 provides a temperature measurement of the structural asset 30 at or proximate to the piezoelectric element 114, the piezoelectric element 114 and the sensor 118 collectively provide more accurate measurements on the conditions, e.g., thickness, of the structural asset 30. Furthermore, the design of the ultrasonic patch transducer 100 allows for the ultrasonic patch transducer 100 to have a compact/small form factor which can then be positioned at any position along most of the structural asset 30. More specifically, a single-element ultrasonic patch transducer 100 can be utilized on any structural asset 30 that has an outer diameter of three (3) inches or greater. An ultrasonic patch transducer 100 having a still smaller form factor would preferably be used for structural assets 30 that have an outer diameter of less than three (3) inches.

The magnet assembly 116 and the housing 112 work together to provide mechanical fixture and alignment (perpendicular to the outer surface of the structural asset 30) of the ultrasonic patch transducer 100 during the curing of the couplant 170. The size, orientation and number of magnets included in the magnet assembly 116 is driven by cost, adequate magnetic force, and alignment stability for flat as well as curved surfaces.

Figure 5:
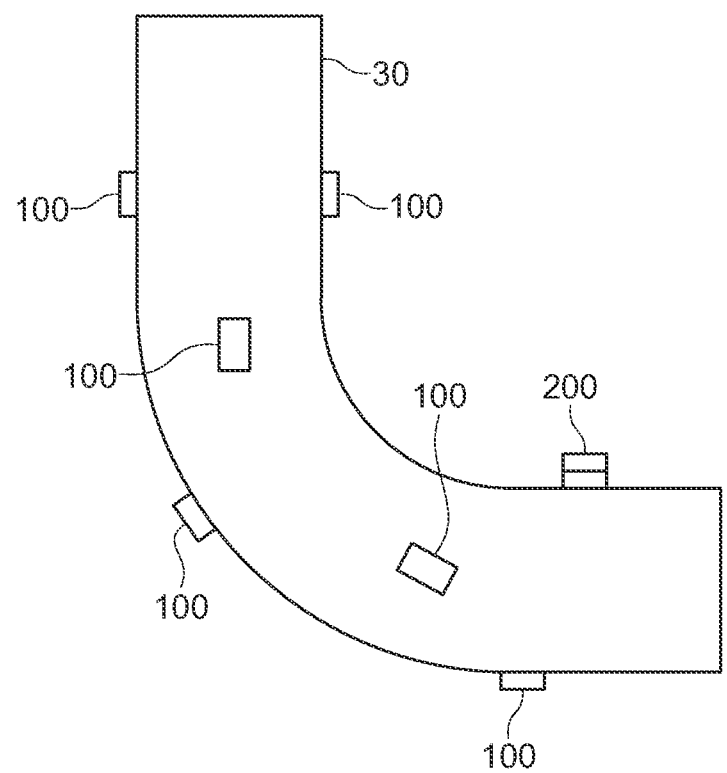
FIG. 5 illustrates a top plan view of a structural asset having multiple sensor assemblies mounted thereon.
Figure 6:
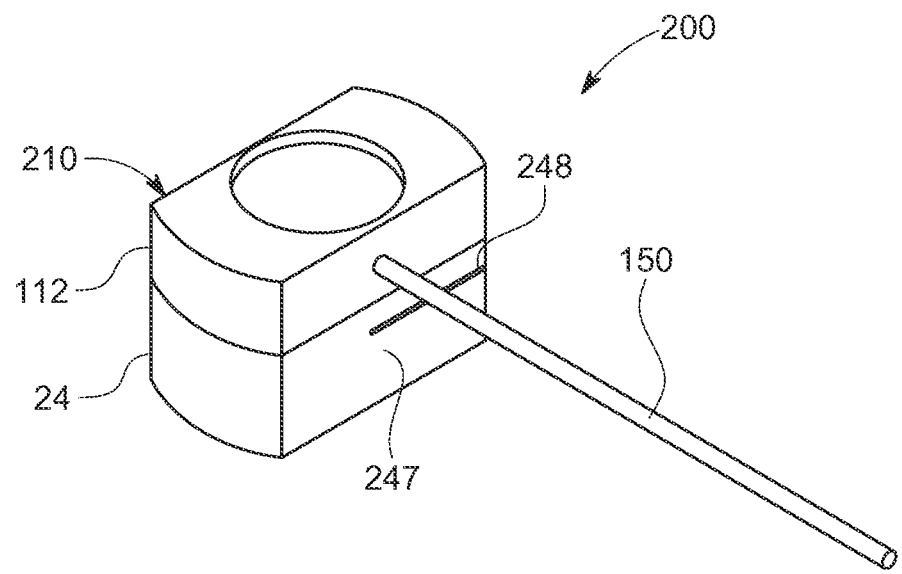
FIG. 6 illustrates a perspective view of a second embodiment of the present disclosure which provides a self-aligning ultrasonic patch transducer.
Figure 7:
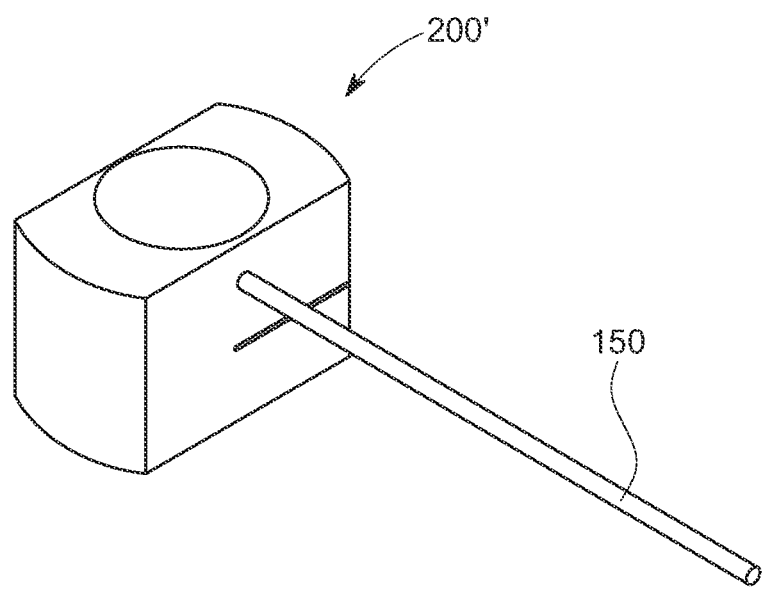
FIG. 7 illustrates a perspective view of an alternate second embodiment of the present disclosure which provides a self-aligning ultrasonic patch transducer.

Attention is directed to FIGS. 5-7, which illustrate a second embodiment of the present disclosure which provides a standardization ultrasonic patch transducer 200, 200'. As noted above, numerous ultrasonic patch transducers 100 can be used as a group, e.g., positioned along the elbow or circumference of the structural asset 30 (which has magnetic properties), to realize true distributed sensing. In such a configuration, the standardization ultrasonic patch transducer 200, 200' can be used with the group of ultrasonic patch transducers 100 (as illustrated in FIG. 5, but not showing the cable assembly 150, the ID/communication board 160 or the couplant 170). The standardization ultrasonic patch transducer 200, which is best illustrated in FIG. 6, includes a modified sensor assembly 210, the cable assembly 150, the ID/communication board 160 (not shown in FIG. 6), and the couplant 170 (not shown in FIG. 6). The modified sensor assembly 210 is identical to the sensor assembly 110, except that the sensor assembly 210 further includes a steel block 24 which is fixedly secured to the lower surface 126 of the housing 112. The steel block 24 has two bores (not shown) which extend from a planar bottom surface thereof to a top surface thereof which align with the recesses 142a, 142b. The first and second magnets 144a, 144b are elongated and extend outwardly from the lower surface 126 and into the bores such that the lower ends of the first and second magnets 144a, 144b are planar with the bottom surface of the steel block 24. The steel block 24 is preferably configured to have an outer configuration/shape which matches the outer configuration/shape of the housing 112, as illustrated in FIG. 6. The steel block 24 has a notch 248 provided through a portion thereof. The notch 248 provides for a clear interface for ultrasonic signal to be reflected; a physical mark that labels a predefined distance from the notch 248 to the bottom surface of steel block 24. The first and second magnets 144a, 144b provide for proper alignment on the structural asset 30 and the couplant 170 secures the steel block 24 to the structural asset 30. In an alternative second embodiment, as illustrated in FIG. 7, the standardization ultrasonic patch transducer 200' has the steel block 24 and the housing 112 integrally formed. The standardization ultrasonic patch transducer 200, 200' functions to calibrate the measurement system when a group of ultrasonic patch transducers 100 are utilized. The standardization ultrasonic patch transducer 200, 200' works to ensure that the system always performs the same way, which is required by industrial standards.

Figure 8:
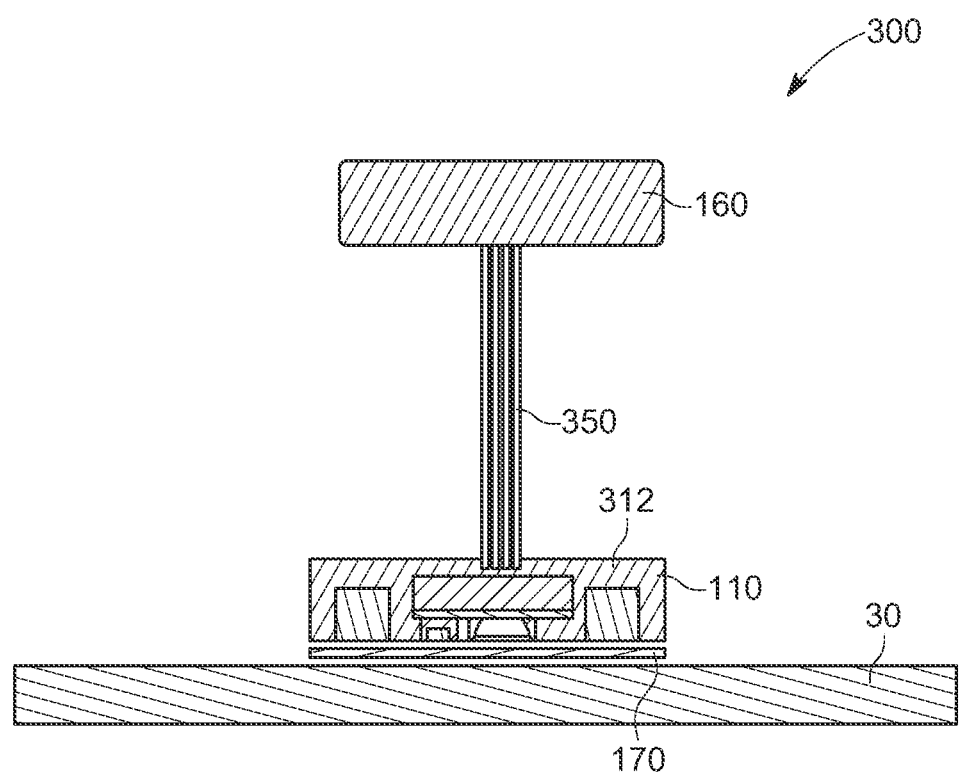
FIG. 8 illustrates a cross-sectional view of a third embodiment of the present disclosure which provides a self-aligning ultrasonic patch transducer.
Figure 9:
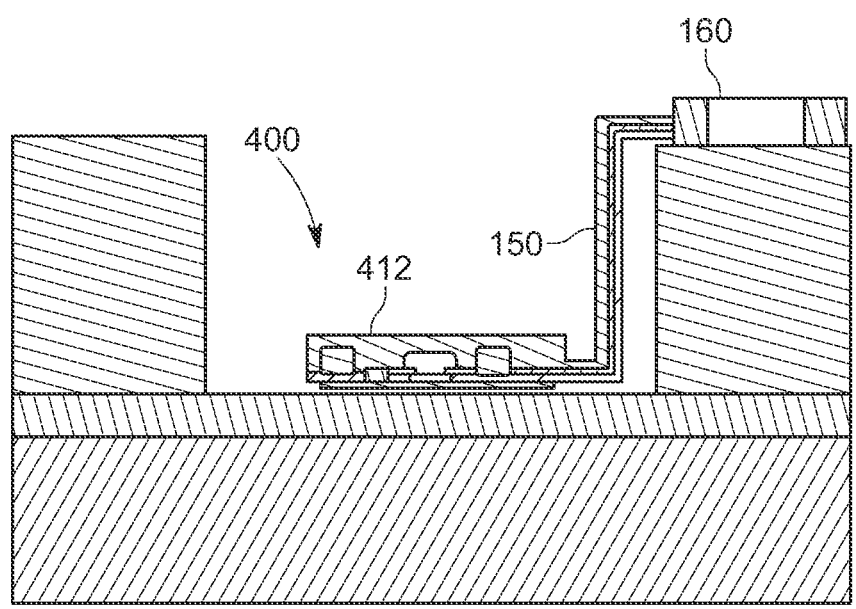
FIG. 9 illustrates a cross-sectional view of the third embodiment of the self-aligning ultrasonic patch transducer.
Figure 10:
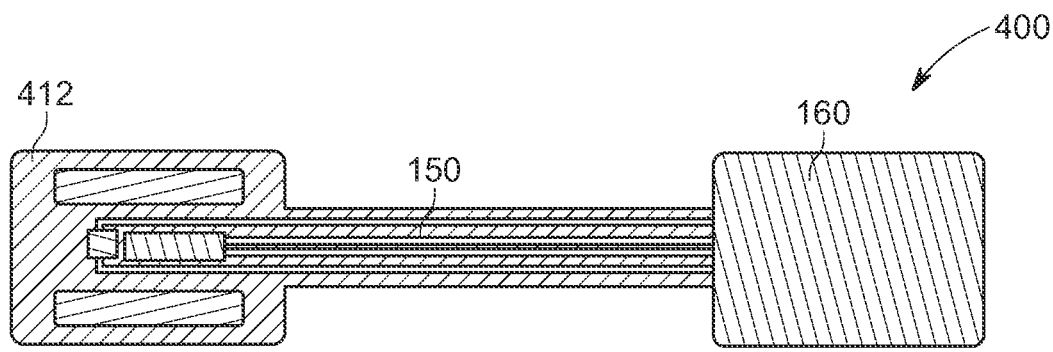
FIG. 10 illustrates a cross-sectional view of the third embodiment.
Figure 11:
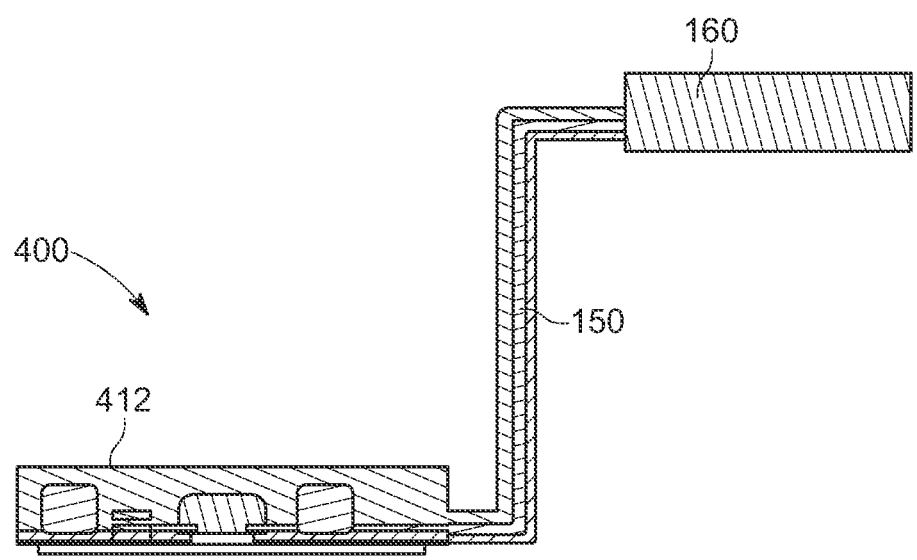
FIG. 11 illustrates a cross-sectional view of the third embodiment.

Attention is directed to FIGS. 8-11, which illustrates a third embodiment of the present disclosure which provides an alternative self-aligning ultrasonic patch transducer 300 as shown in FIG. 8 and 400 as shown in FIGS. 9-11. Ultrasonic patch transducer 300 or 400 is generally identical to ultrasonic patch transducer 100, except that instead of the cable assembly 150, cable assembly 350 is provided In FIG. 8, and instead of housing 112, housing 312 is provided in FIG. 8 and housing 412 is provided in FIGS 9-11. Cable assembly 350 is a flexible/semi-rigid cable assembly. The housing 312 may be slightly modified as compared to housing 112 so as to accommodate cable assembly 350 instead of cable assembly 150. This third embodiment of the ultrasonic patch transducer 300 or 400 is well suited for use in locations where there are space constraints. The flexible cable assembly 350 can be extended out and attached to the ID/communication board 160 at the position where the ID/communication board 160 is located.

Figure 12:
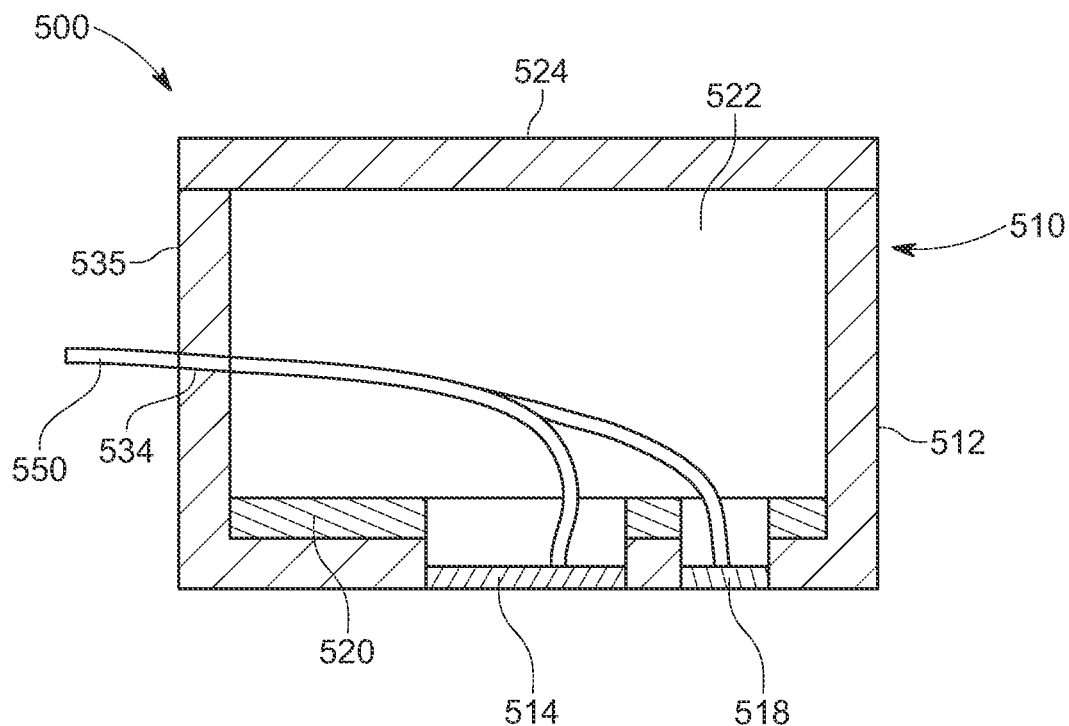
FIG. 12 illustrates a cross-sectional view of a fourth embodiment of the ultrasonic patch transducer.
Figure 13:
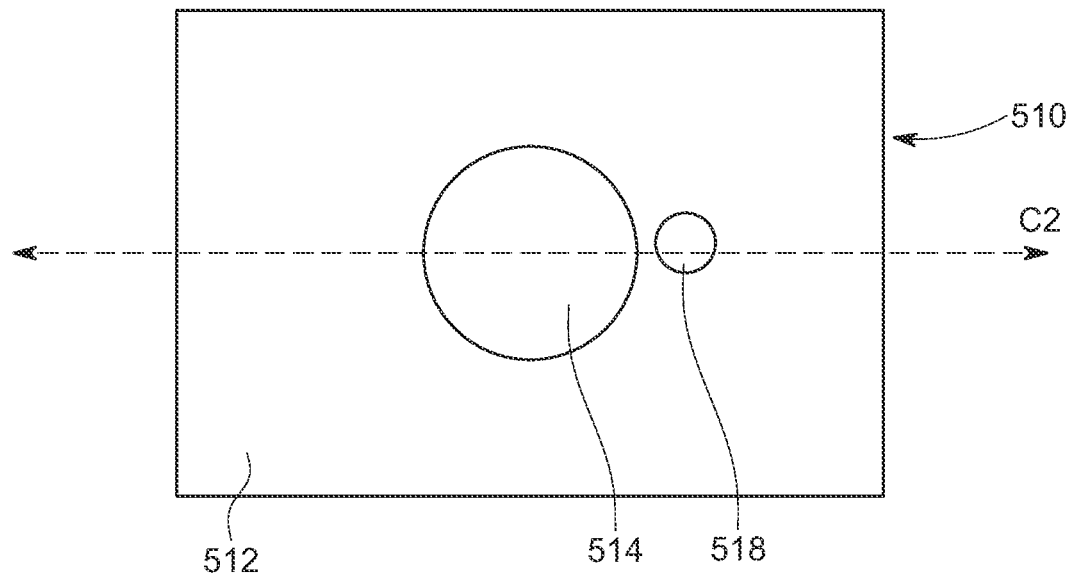
FIG. 13 illustrates a bottom plan view of the fourth embodiment of the ultrasonic patch transducer.
Figure 14:
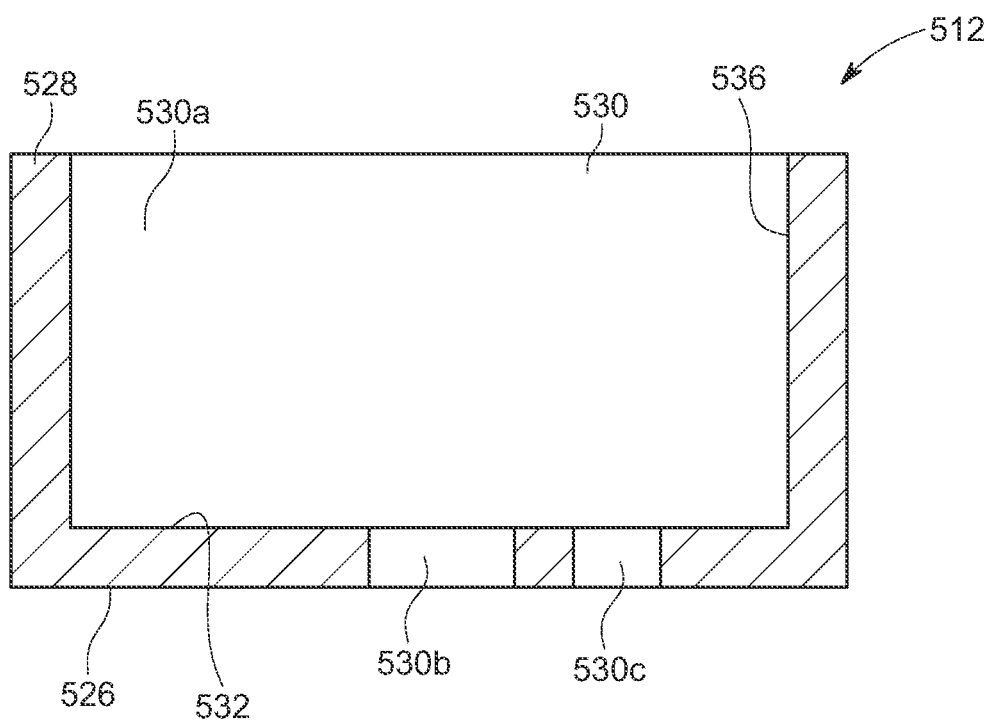
FIG. 14 illustrates a cross-sectional view of a housing of the fourth embodiment of the self-aligning ultrasonic patch transducer.

Attention is directed to FIGS. 12-14, which illustrate a fourth embodiment of the present disclosure which provides a non-self-aligning ultrasonic patch transducer 500, which may be designed for high temperature applications, e.g., applications of at least 200° C. Unlike the ultrasonic patch transducer 100, the ultrasonic patch transducer 500 does not include a magnet assembly and, therefore, the size/cost of the ultrasonic patch transducer 500 can be reduced as compared to the size/cost of the ultrasonic patch transducer 100 and, thus, the ultrasonic patch transducer 500 enables the user to deploy several ultrasonic patch transducers 500 as a group, e.g., positioned along the elbow or circumference of an asset 30 (which may or may not have magnetic properties—which will be discussed in further detail below), to realize true distributed sensing.

The ultrasonic patch transducer 500 includes a sensor assembly 510, a cable assembly 550, an optional ID/communication board (not shown), and a couplant (not shown). The ID/communication board and the couplant of the ultrasonic patch transducer 500 are identical to the ID/communication board 160 and the couplant 170 of the ultrasonic patch transducer 100 and therefore, for brevity purposes, will not again be described/illustrated.

As best illustrated in FIGS. 12 and 13, the sensor assembly 510 includes a housing 512, a piezoelectric element 514, one or more sensors 518, a printed circuit board (PCB) 520, potting material 522, and a cap 524.

The housing 512, as best illustrated in FIGS. 13 and 14, is preferably an elongated structure (e.g., one where a length of the housing 512 is greater in a first direction as compared to a width of the housing 512 in a second direction, which is orthogonal to the first direction). The housing 512 is preferably symmetrical about a centerline C2 (which extends in the first direction) thereof and preferably has a rectangular cross-section, which is orthogonal to the first direction. The housing 512 has a planar lower surface 526 and an upper surface 528. The housing 512 is preferably made of a rigid material, such as plastic or metal, however, the material must be able to withstand continuous heat exposure of at least 200° C., as well as outdoor exposure, e.g., exposure to temperature fluctuations, rain, snow, ice, UV exposure, etc. The housing 512 may also advantageously be formed of a material that has magnetic properties.

The housing 512 has a through-hole 530 which extends therethrough from the lower surface 526 to the upper surface 528 (e.g., a third direction which is orthogonal to both the first and second directions). The through hole 530 preferably has an upper hole portion 530a and first and second lower hole portions 530b, 530c. The upper hole portion 530a and the first and second lower hole portions 530b, 530c may be configured in any suitable shape, but are illustrated herein as being cylindrical. The upper hole portion 530a has an upper end which is open to the upper surface 528. The first lower hole portion 530b has a lower end which is open to the lower surface 526 and an upper end that is in direct communication with a lower end of the upper hole portion 530a. The second lower hole portion 530c has a lower end which is open to the lower surface 526 and an upper end that is in direct communication with the lower end of the upper hole portion 530a. The first and second lower hole portions 530b, 530c are not in direct communication with each other. The first and second lower hole portions 530b, 530c are centered along the centerline C2.

The upper hole portion 530a is defined by a side wall which extends from the upper surface 528 to a lower wall 532. The side wall defining the upper hole portion 530a may have an undercut portion (not shown) similar to the undercut portion 140 of the ultrasonic patch transducer 100. The lower wall 532 may be parallel to the lower surface 526. The first and second lower hole portions 530b, 530c are spaced inwardly of the side wall defining the upper hole portion 530a such that the lower wall 532 forms a shoulder between the upper hole portion 530a and the first and second lower hole portions 530b, 530c.

The housing 512 further has an aperture 534 which extends through the side wall defining the upper hole portion 530a and into the upper hole portion 530a via an outer side surface 535 of the housing 512. The side surface 535 preferably runs orthogonal to the centerline C2 and the aperture 534 extending through the housing 512 to the side surface 535 is preferably parallel to the centerline C2.

The piezoelectric element 514 is configured to be positioned within the first lower portion 530b of the housing 512. The piezoelectric element 514 may be formed in any suitable shape, e.g., circular, rectangular, etc., but is preferably configured to match the configuration of the first lower portion 530b of the housing 512. The piezoelectric element 514 may be formed of any suitable material, e.g., PZT2, PZT4, etc. A lower face of the piezoelectric element 514 is configured to be generally planar with the lower surface 526 of the housing 512. The piezoelectric element 514 is centered along the centerline C2.

Sensor 518 is preferably a resistance temperature detector (RTD) that is used for temperature compensation as sound velocity in the structural asset 30 is a function of temperature. The sensor 518 is configured to be positioned and held in place within the second lower portion 530c of the housing 512 to ensure good thermal contact between the structural asset 30 and the sensor 518 for accurate temperature measurements. The sensor 518 is centered along the centerline C2. A lower face of the sensor 518 is configured to be generally planar with the lower surface 526 of the housing 512. This places the sensor 518 proximate to the piezoelectric element 514.

PCB 520 is configured to be positioned and held in place within the upper portion 530a of the housing 512, preferably resting on the lower wall 532. The PCB 520 may have any suitable shape, but preferably has the same outer configuration as the upper portion 530a of the housing 512. In a preferred embodiment, the PCB 520 is ring-shaped. The PCB 520 is configured to be electrically connected to the piezoelectric element 514 and to the sensor 518. The electrical connections may be made by traditional wire-bonding technique, three-dimensional printing electrodes on plastic or via PCB board as a part of the assembly.

Potting material 522 is configured to be provided within the through-hole 530 in order to hold the piezoelectric element 514, the sensor 518 and the PCB 520 in their desired positioned within the housing 512. More specifically, potting material 522 is provided within the first lower portion 530b above the piezoelectric element 514, potting material 522 is provided within the second lower portion 530c above the sensor 518, and potting material 522 is provided within the upper portion 530a above the PCB 520. Depending on the configuration of the PCB 520, the potting material 522 in the upper portion 530a may be in contact with the potting material 522 in the first lower portion 530b and/or the second lower portion 530c. The potting material 522 is preferably a material, such as epoxy, that is able to withstand continuous heat exposure of at least 200° C. with reasonable thermal cycling, such as high temperature epoxy or silicone. If provided, the undercut (not shown) in the wall 536 of the housing 512 helps to contain the potting material 522 (and thus the PCB 520) inside the through-hole 530 of the housing 512 during heating and cooling processes.

Cap 524 may be configured to be positioned on the upper surface 528 of the housing 512, thereby closing off the through-hole 530 and securing the piezoelectric element 514, the sensor 518, the PCB 520 and the potting material 522 in place within the through-hole 530. The cap 524 may be secured to the housing 512 in any suitable manner, and forms part of the housing 512 once secured.

Cable assembly 550 connects the sensor assembly 510 to the ID/communication board. The cable assembly 550 may be single conductor cable, like coaxial cable, or multiple-conductors cable, like PLTC or ribbon cable. A first end of the cable assembly 550 is configured to extend into the upper portion 530a of the housing 512 via the aperture 534 such that it can be electrically connected to the PCB 520. The cable assembly 550 may have any desired/required length.

In operation, the ultrasonic patch transducer 500 will work in the same manner as ultrasonic patch transducer 100, but as the ultrasonic patch transducer 500 does not include the magnet assembly 116, such that the ultrasonic patch transducer 500 is not self-aligning. In some instances, self-alignment of the ultrasonic patch transducer 500 may not be important, e.g., in connection with structural assets 30 having flat surfaces or in very large structural assets 30, e.g., those whose outside diameter/curvature is very large. In view of this, an alignment device 700, see FIGS. 17-19, 21-23, as will be described in greater detail hereinbelow, is provided and temporarily becomes part of the ultrasonic patch transducer 500 for the purpose of installation/securement of the ultrasonic patch transducer 500 to most structural assets 30.

Figure 15:
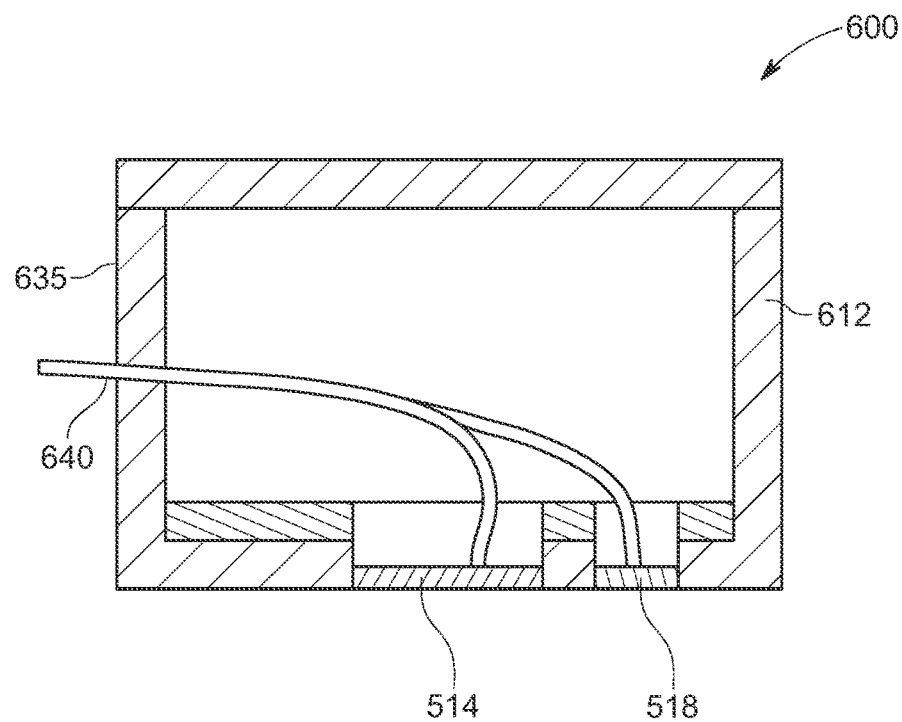
FIG. 15 illustrates a cross-sectional view of a fifth embodiment of the present disclosure which provides an self-aligning ultrasonic patch transducer.
Figure 16:
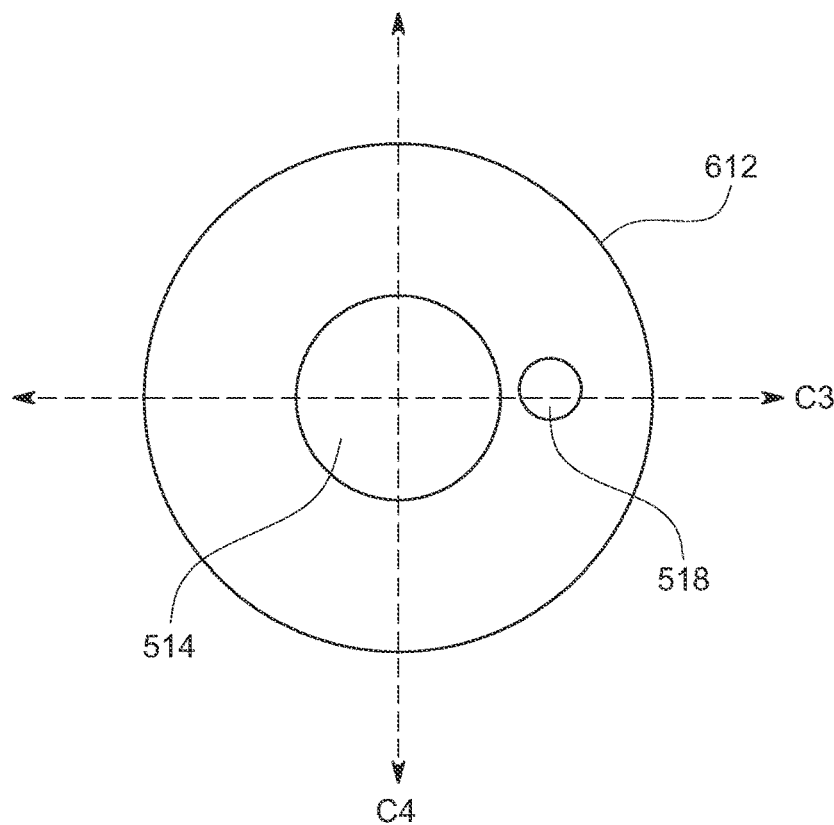
FIG. 16 illustrates a bottom plan view of the of the self-aligning ultrasonic patch transducer.
Figure 17:
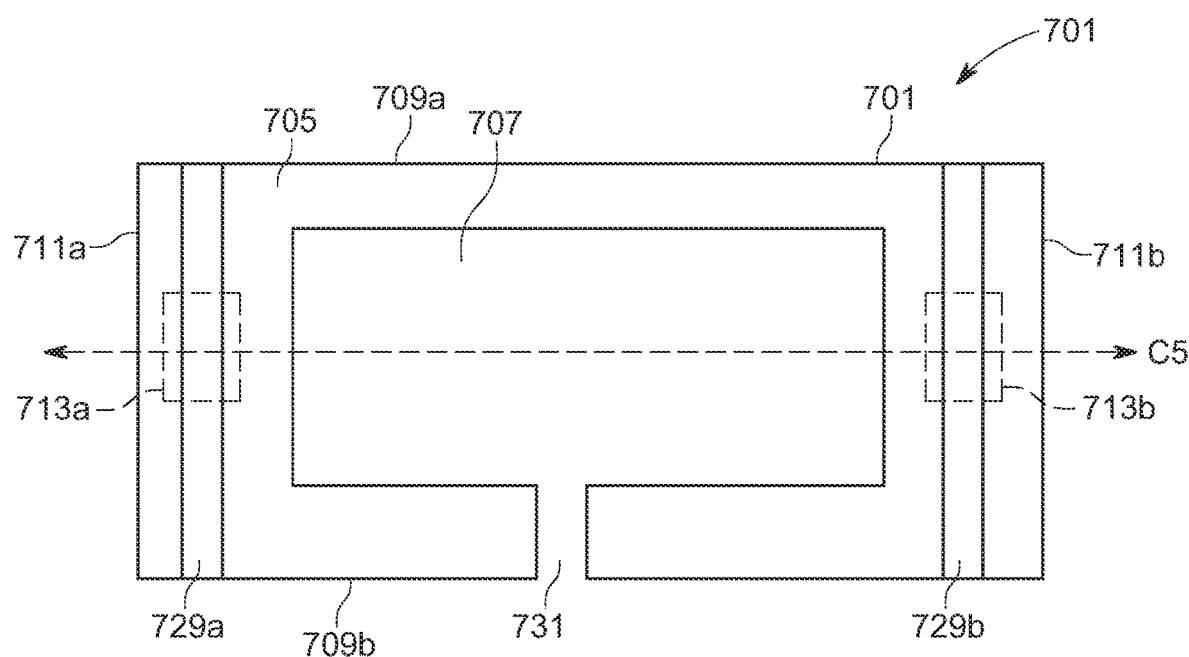
FIG. 17 illustrates a top plan view of an embodiment of the present disclosure which provides an alignment device.

Attention is directed to FIGS. 15 and 16, which illustrate a fifth embodiment of the present disclosure which provides a non-self-aligning ultrasonic patch transducer 600, which may be designed for high temperature applications, e.g., applications of at least 200° C. Ultrasonic patch transducer 600 is identical to ultrasonic patch transducer 500, except as discussed herein. Therefore, like reference numerals are used to denote like components, with the like components being denoted in the six hundreds.

The housing 612 of the ultrasonic patch transducer 600, unlike the housing 512 of the ultrasonic patch transducer 500, is not an elongated structure. The housing 612 is preferably symmetrical about more than one centerline, e.g., centerline C3 (which extends in a first direction) and centerline C4 (which extends in a second direction, which is orthogonal to the first direction). The housing 612 preferably has a circular cross-section, but may have any other suitable cross-section, such as square, hexagonal, octagonal, etc. The housing 612 thus defines an aperture 634 which extends into the upper hole portion 630a thereof via an outer side surface 635 of the housing 612. The aperture 634 preferably extends through the housing 612 to the side surface 635 in a manner that is preferably along centerline C4 and orthogonal to the centerline C3. Cap may be configured to be positioned on the upper surface 628 of the housing 612, thereby closing off the through-hole 630a and securing the piezoelectric element 514, the sensor 518, the PCB 520 and the potting material 522 in place within the through-hole 630a. The cap may be secured to the housing 612 in any suitable manner, and forms part of the housing 612 once secured.

In operation, the ultrasonic patch transducer 600 will work in the same manner as ultrasonic patch transducer 100, but as the ultrasonic patch transducer 600 does not include the magnet assembly 116, the ultrasonic patch transducer 600 is not self-aligning. In some instances, self-alignment of the ultrasonic patch transducer 600 may not be important, e.g., in connection with structural assets 30 having flat surfaces or in very large structural assets 30, e.g., those whose outside diameter/curvature is very large. In view of this, installation/securement of the ultrasonic patch transducer 600 to most structural assets 30 is preferably performed in conjunction with an alignment device 801, see FIG. 20, as will be described in greater detail hereinbelow.

Attention is directed to FIGS. 17-19, 21-23, which illustrates the alignment device 700 which temporarily becomes part of the ultrasonic patch transducer 500 for the purpose of installation/securement of the ultrasonic patch transducer 500 to most structural assets 30. The alignment device 700 may also temporarily become part of the ultrasonic patch transducers 100, 200, 200', 300 for the purpose of installation/securement to most structural assets 30. Ultrasonic patch transducer 100 is shown in some of the figures, but only for illustrative purposes.

The alignment device 700 preferably includes an elongated housing 701 having a length greater in a first direction as compared to a width of the housing in a second direction, which is orthogonal to the first direction. The housing 701 is preferably symmetrical about a centerline C5 thereof (which extends in the first direction) (except as otherwise noted below) and preferably has a rectangular cross-section. The housing 701 has a lower surface 703 and an upper surface 705.

The housing 701 has parallel walls 709a, 709b which extend in the first direction and parallel walls 711a, 711b which extend in the second direction. The wall 711a is at a first end of the walls 709a, 709b, and the wall 711b is at a second, opposite end of the walls 709a, 709b such that a through-hole 707 is formed, which extends therethrough from the lower surface 703 to the upper surface 705 (e.g., a third direction which is orthogonal to both the first and second directions). The walls 709a, 709b have a longer length than the walls 711a, 711b such that a generally rectangular shape is formed. The through-hole 707 is sized to accommodate the housing 112, 312, 512 of the ultrasonic patch transducer 100, 200, 200', 300, 500. As the housing 112, 312, 512 of the ultrasonic patch transducer 100, 200, 200', 300, 500 is an elongated structure, the through-hole 707 is also sized as an elongated structure. The housing 112, 312, 512 of the ultrasonic patch transducer 100, 200, 200', 300, 500 is configured to be positioned within the through-hole 707 such that the centerline C1, C2 is common with the centerline C5. In an embodiment, the housing 112, 312, 512a and the through-hole 707 are rectangular.

The walls 711a, 711b preferably have a constant height (in the third direction) along their entire width (along the second direction) and extend between the lower surface 703 and the upper surface 705. The alignment device 700 further has a magnet assembly associated therewith which preferably includes a first magnet 713a positioned within the wall 711a forward of the through-hole 707 and a second magnet 713b positioned within the wall 711b rearward of the through-hole 707. The first and second magnets 713a, 713b are preferably positioned to be centered along the centerline C5. The first and second magnets 713a, 713b are illustrated in dashed line in FIGS. 15 and 17.

Figure 22:
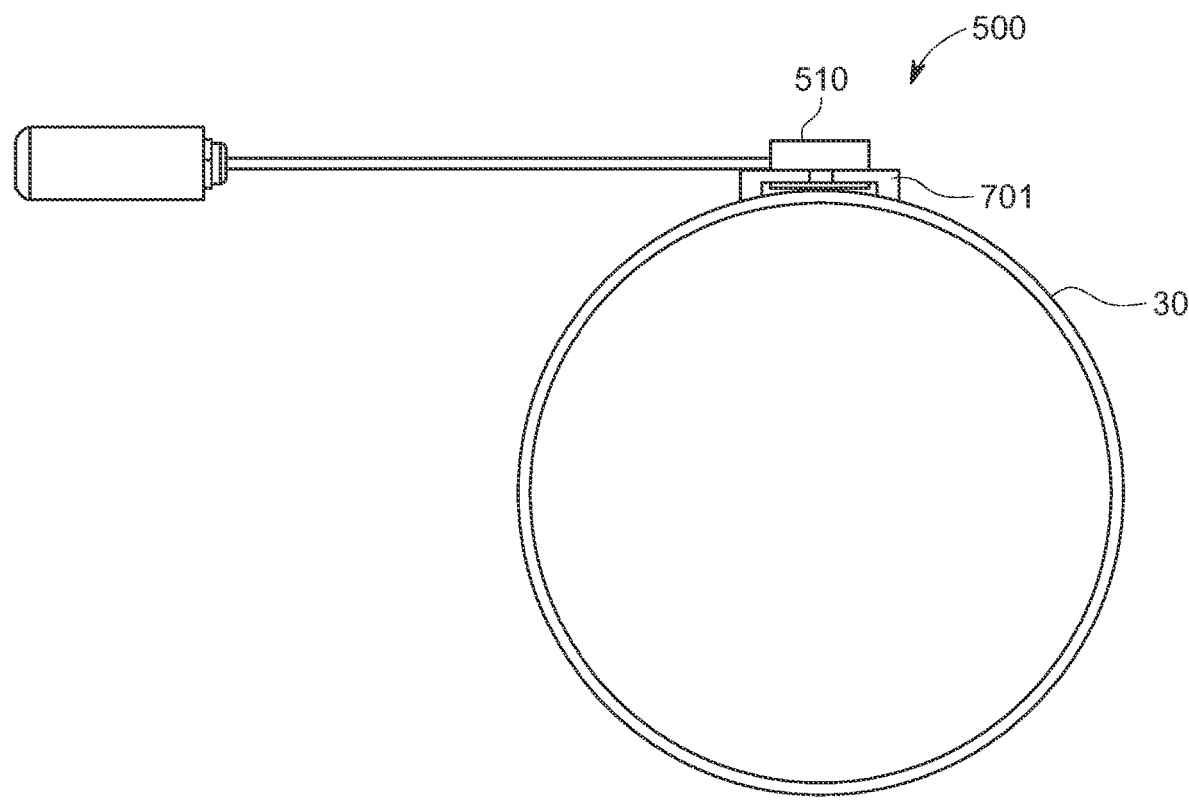
FIG. 22 illustrates an end view of the ultrasonic patch transducer, the structural asset and the alignment device.
Figure 26:
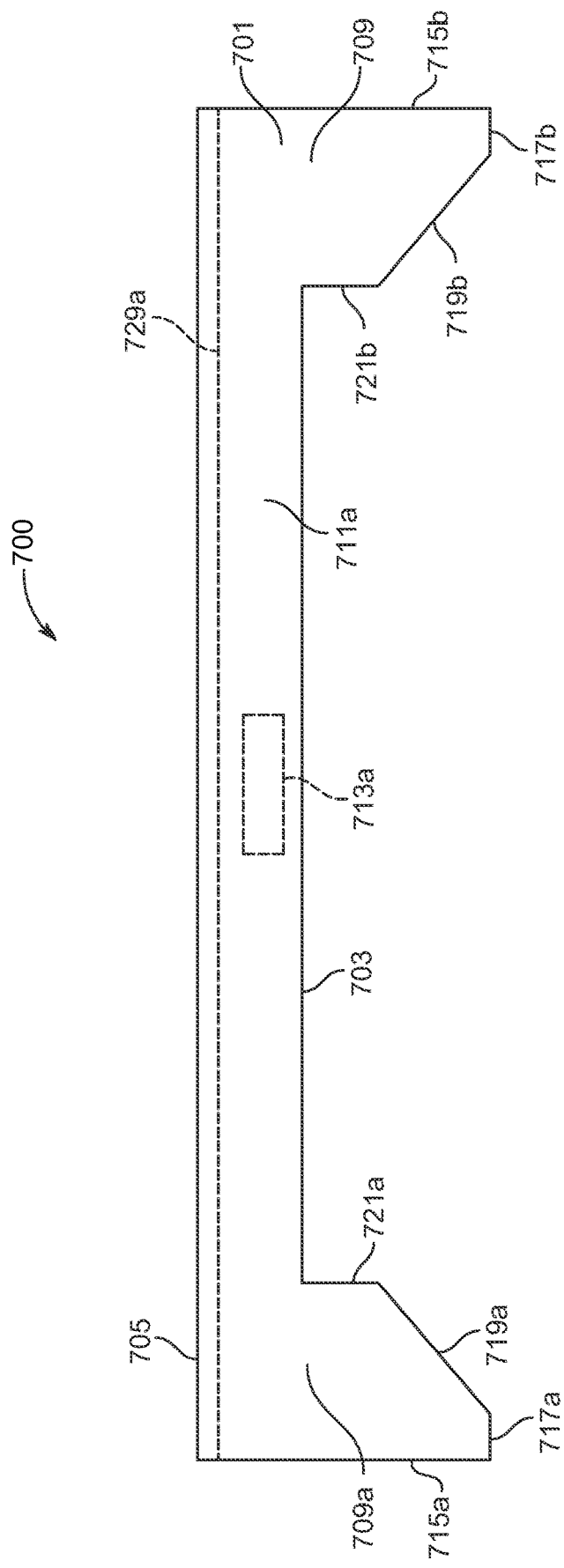
FIG. 26 illustrates an end view of an alignment device for the non-self-aligning ultrasonic patch transducer of FIGS. 12-14.

The walls 709a, 709b, as best illustrated in FIG. 26 but also shown un FIG. 22, have a configuration which does not have a constant height (in the third direction). Wall 709a has a first outer wall surface 715a which extends downward from the upper surface 705 in the third direction, a second lower wall surface 717a which extends horizontally to the right (as viewed in FIG. 26) from a lower edge of the first outer wall surface 715a, a third lower wall surface 719a which extends from an inner edge of the second lower wall surface 717a and angularly upwardly and to the right (as viewed in FIG. 26), and a fourth inner wall surface 721a which extends from an inner edge of the third lower wall surface 719a and up to the lower wall surface 703 in the third direction. Wall 709b is the mirror image and has a first outer wall surface 715b which extends downward from the upper surface 705 in the third direction, a second lower wall surface 717b which extends horizontally to the left (as viewed in FIG. 26) from a lower edge of the first outer wall surface 715b, a third lower wall surface 719b which extends from an inner edge of the second lower wall surface 717b and angularly upwardly and to the left (as viewed in FIG. 26), and a fourth inner wall surface 721b which extends from an inner edge of the third lower wall surface 719a and up to the lower wall surface 703 in the third direction. The wall surfaces 721a, 721b face each other, and the wall surfaces 719a, 719b face each other. The wall surfaces 719a, 719b are at the same angle from the vertical. For example, each wall surfaces 719a, 719b may be angled at 45 degrees from the vertical.

The wall 709b of the alignment device 700 preferably has a cut-through or slot 731 provided therethrough at a middle portion thereof. The slot 731 extends from the through-hole 707 to an outer surface of the wall 709b.

The housing 701 preferably has first and second grooves 729a, 729b provided in the upper surface 705. Groove 729a extends from the wall surface 715a of the wall 709a, along the width of the wall 711a (in the second direction) to the first outer wall surface 715b of the wall 709. The first groove 729a is provided forward of the through-hole 707. Groove 729b extends from the wall surface 715a of the wall 709a, along the width of the wall 711b (in the second direction) to the first outer wall surface 715b of the wall 709b. The second groove 729b is provided rearward of the through-hole 707. The grooves 729a, 729b are parallel to each other. The magnets 713a, 713b may be positioned underneath the grooves 729a, 729b.

As discussed above, the ultrasonic patch transducer 100, 200, 200', 300 are self-aligning and, therefore, it is not necessary to use the alignment device 700 in order to properly position and mount the ultrasonic patch transducer 100, 200, 200', 300 to the structural asset 30. This being said, the alignment device 700 can be used to properly position and mount the ultrasonic patch transducer 100, 200, 200', 300. There may be benefits to the user to still use the alignment device 700 in connection with the positioning and mounting of the ultrasonic patch transducer 100, 200, 200', 300.

Figure 18:
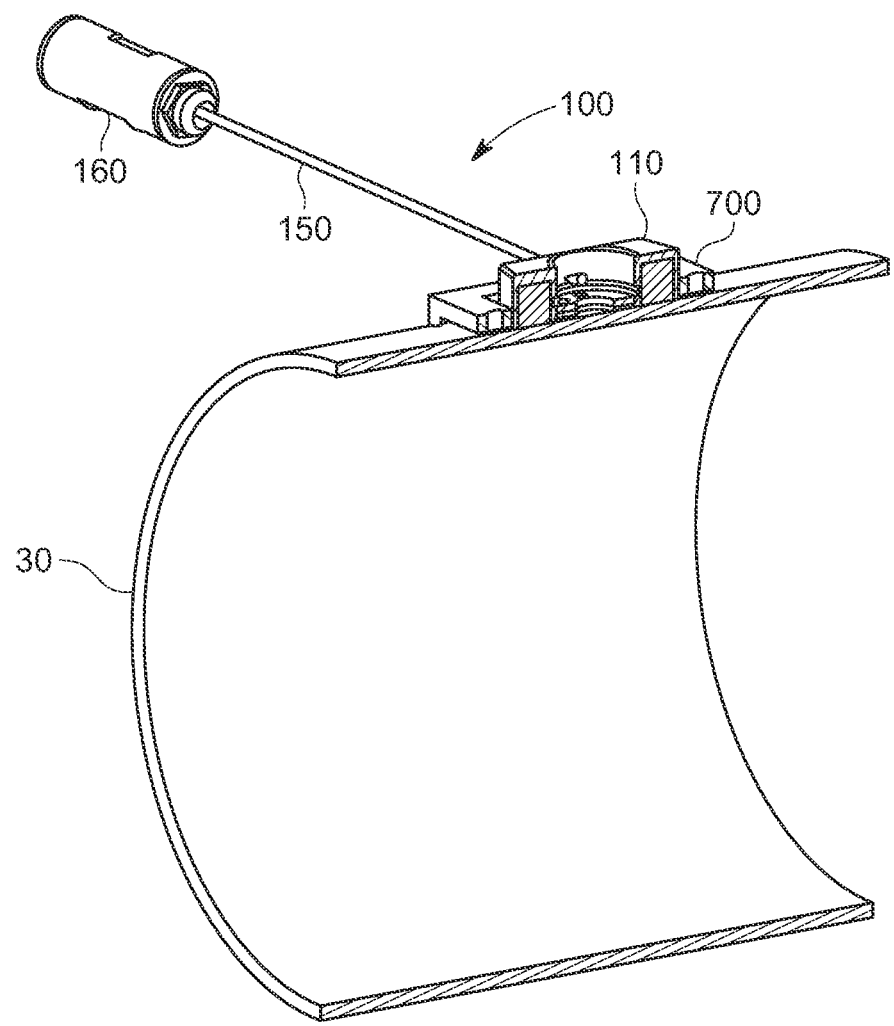
FIG. 18 illustrates a perspective cross-sectional view of the ultrasonic patch transducer, the structural asset and the alignment device.
Figure 19:
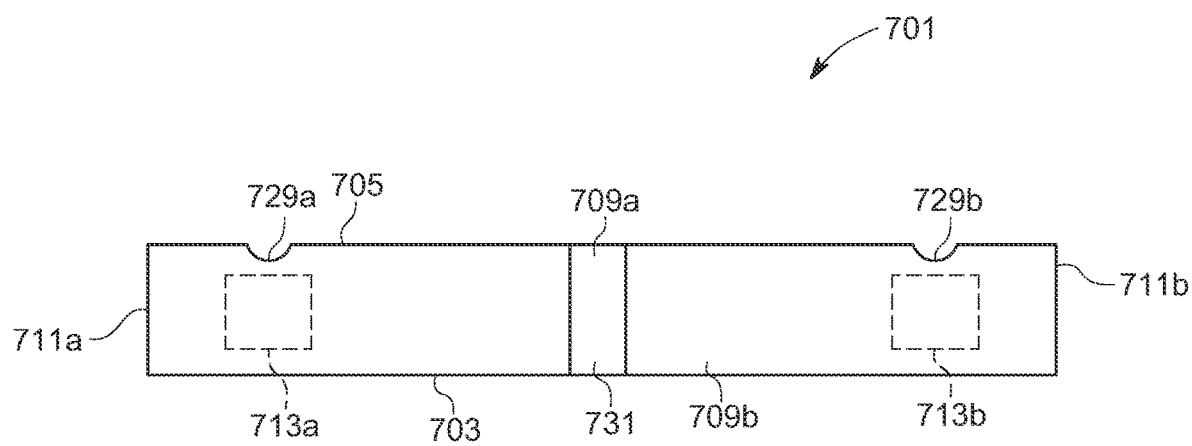
FIG. 19 illustrates a side elevation view of the alignment device.

In operation, when the alignment device 700 is used with any of the ultrasonic patch transducers 100, 200, 200', 300, 500, the alignment device 700 is positioned in a lengthwise direction along a length of the magnetic structural asset 30 such that each of the magnets 713a, 713b of the alignment device 700 are both positioned along a tangent plane of the structural asset 30 and secures the alignment device 700 to the structural asset 30, see FIG. 18 as an example. As the magnets 713a, 713b are both positioned along a tangent plane of the structural asset 30, the alignment device 700 is thus properly positioned/aligned such that the housings 112, 312, 512 of the ultrasonic patch transducers 100, 200, 200', 300, 500 can likewise be properly positioned/aligned. Furthermore, the angled wall surfaces 719a, 719b, respectively, of the walls 709a, 709b of the alignment device 700 accommodate different diameters of structural asset 30, 30' and further act to properly position/align the alignment device 700 along the structural asset 30. With the alignment device 700 properly positioned/aligned, the couplant 170 is applied to the lower surface of the sensor assembly 110, 210, 510 of the ultrasonic patch transducers 100, 200, 200', 300, 500 (or to the portion of the outer surface of the structural asset 30 that is accessible via the through-hole 707 of the alignment device 700) and the sensor assembly 110, 210, 510 is then positioned within the through-hole 707 of the alignment device 700 (as the through-hole 707 and the housing 112, 312 both have elongated lengths, this ensures that the piezoelectric element 114 and the sensor 118 will be properly positioned/aligned along the tangent plane of the structural asset 30). As a result, the housings 112, 312, 512 and the housing 701 temporarily form a two-part housing in that the housings 112, 312, 512 form a first housing part and the housing 701 forms a second housing part. When the couplant 170 is cured, the sensor assembly 110, 210, 510 is secured to the structural asset 30, and the alignment device 700 can be removed from the structural asset 30 and reused to mount other ultrasonic patch transducers 100, 200, 200', 300 to the same or different structural asset 30. The cable assembly 150, 350, 550 of the ultrasonic patch transducer 100, 200, 200', 300, 500 is positioned within (or more likely above) the slot 731, such that the alignment device 700 can be removed when desired. As discussed above, the ultrasonic patch transducer 500 is not self-aligning (no magnets provided) and, therefore, except in certain circumstances where alignment is not important, it is advantageous to use the alignment device 700 in order to properly position and mount the ultrasonic patch transducer 500 to the structural asset 30.

Figure 23:
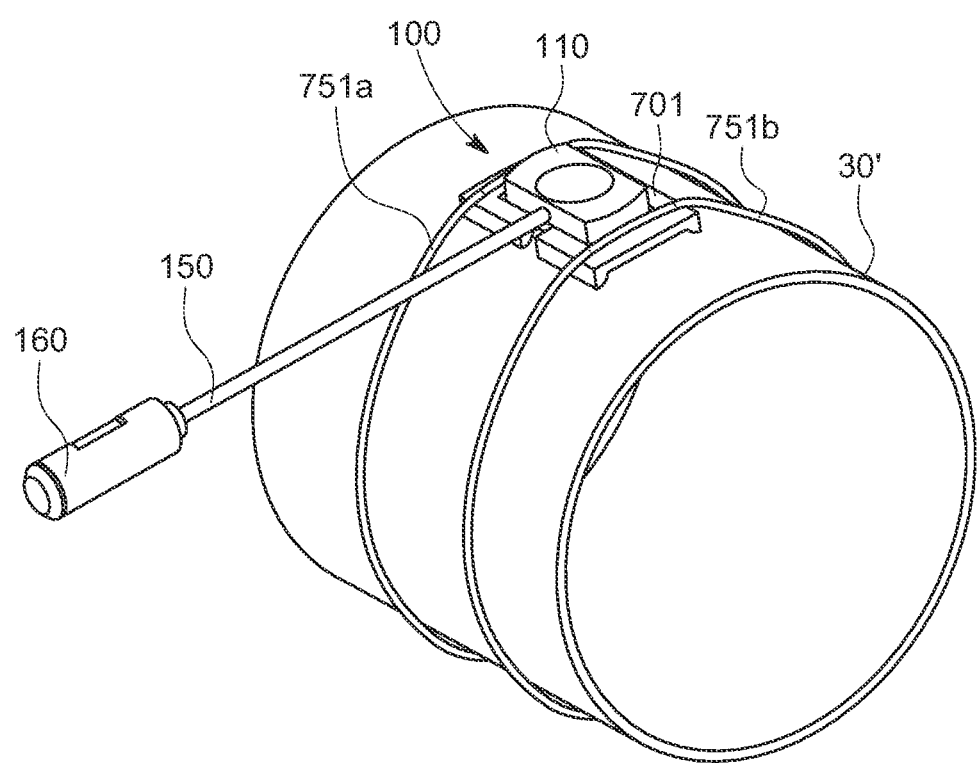
FIG. 23 illustrates a perspective view of the ultrasonic patch transducer, the structural asset and the alignment device.

In certain instances, the structural asset 30 to which the ultrasonic patch transducer 100, 200, 200', 300, 500 is to be mounted (for condition monitoring), may not be magnetic (identified herein as non-magnetic structural asset 30', see FIG. 23). As such, it is clear that the self-aligning aspects of the ultrasonic patch transducer 100, 200, 200', 300 will not aid in the alignment thereof to the non-magnetic structural asset 30'. In such instances, the alignment device 700 will aid in the proper alignment/positioning of the ultrasonic patch transducer 100, 200, 200', 300, 500 to the non-magnetic structural asset 30'. In operation, as illustrated in FIG. 23 (showing ultrasonic patch transducer 100 as an example), the alignment device 700 is positioned in a lengthwise direction along a length of the non-magnetic structural asset 30' such that the angled wall surfaces 719a, 719b, respectively, of the walls 709a, 709b of the alignment device 700 sit against the outer wall of the non-magnetic structural asset 30', thus acting to properly position/align the alignment device 700 along the non-magnetic structural asset 30'. Once the alignment device 700 is properly positioned/aligned along the non-magnetic structural asset 30', straps 751a, 751b are wrapped around the non-magnetic structural asset 30' and the alignment device 700, with the strap 751a being positioned within the groove 729a, and the strap 751b being positioned within the groove 729b, to thereby hold the alignment device 700 in place (essentially clamping the alignment device 700 against the non-magnetic structural asset 30'). The straps 751a, 751b are perpendicular to the axial direction of the structural asset 30'. With the alignment device 700 properly positioned/aligned, the couplant 170 is applied to the lower surface of the sensor assembly 110, 210, 510 of the ultrasonic patch transducers 100, 200, 200', 300, 500 (or to the portion of the outer surface of the non-magnetic structural asset 30' that is accessible via the through-hole 707 of the alignment device 700) and the sensor assembly 110, 210, 510 is then positioned within the through-hole 707 of the alignment device 700 (as the through-hole 707 and the housing 112, 312, 512 both have elongated lengths, this ensures that the piezoelectric element 114, 514 and the sensor 118, 518 will be properly positioned/aligned along the tangent plane of the non-magnetic structural asset 30'). As a result, the housings 112, 312, 512 and the housing 701 temporarily form a two-part housing in that the housings 112, 312, 512 form a first housing part and the housing 701 forms a second housing part. When the couplant 170 is cured, the sensor assembly 110, 210, 510 will then be secured to the non-magnetic structural asset 30' and the alignment device 700 can be removed from the non-magnetic structural asset 30' (by first releasing/removing the straps 751a, 751b) and reused to mount other ultrasonic patch transducers 100, 200, 200', 300, 500 to the same or different structural asset 30, 30'.

Where the alignment device 700 is used in connection with any of the ultrasonic patch transducers 100, 200, 200', 300, 500 to secure same to a magnetic structural asset 30, the grooves 729a, 729b need not be not utilized and, as such, an alignment device 700 that is to be utilized only with the ultrasonic patch transducers 100, 200, 200', 300, 500 can be manufactured without the grooves 729a, 729b. However, if the alignment device 700 is used as a universal alignment device for use on magnetic structural assets 30 and on non-magnetic structural assets 30', the alignment device 700 includes the grooves 729a, 729b despite not being used with a magnetic structural asset 30.

Where the alignment device 700 is used in connection with any of the ultrasonic patch transducers 100, 200, 200', 300, 500 to secure same to a non-magnetic structural asset 30', the magnets 713a, 713b are not utilized and, as such, an alignment device 700 that is to be utilized only with ultrasonic patch transducers 100, 200, 200', 300, 500 on non-magnetic structural assets 30' can be manufactured without the magnets 713a, 713b. However, if the alignment device 700 is used as a universal alignment device (as discussed herein), there is no harm in the alignment device 700 having these features despite them not being used. In such circumstances, the cable assembly 150, 350, 550 of the ultrasonic patch transducer 100, 200, 200', 300, 500 is positioned within (or more likely above) the slot 731, such that the alignment device 700 can be removed when desired.

Figure 20:
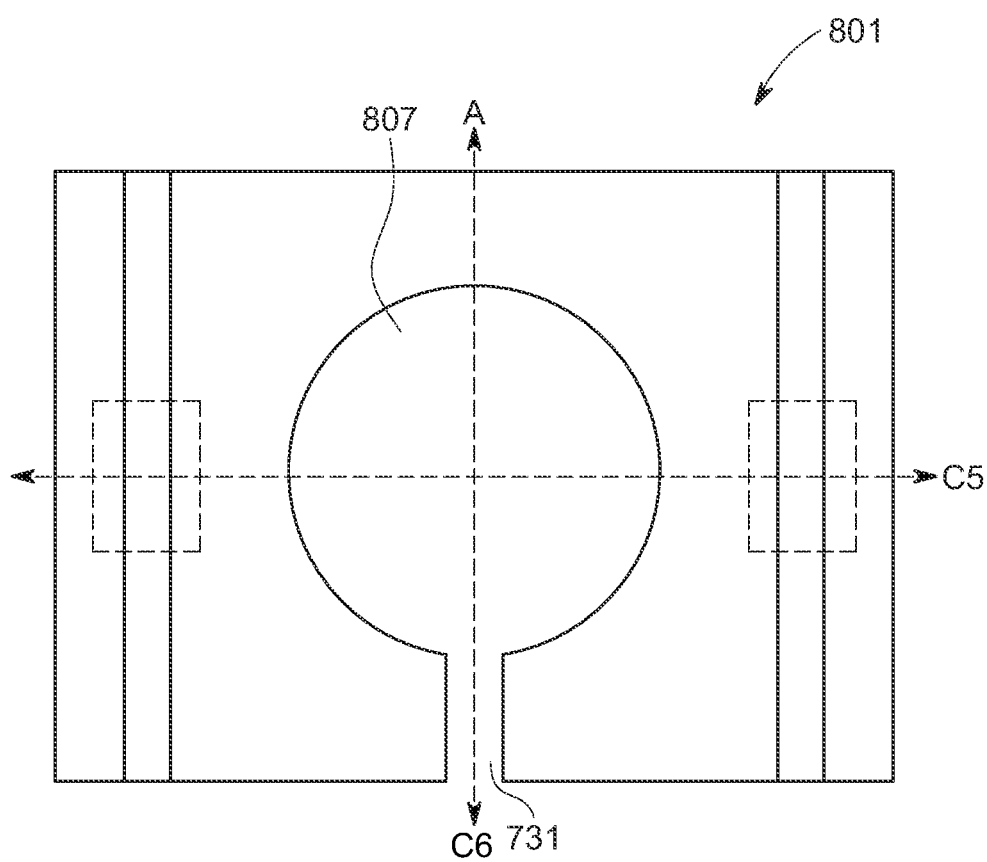
FIG. 20 illustrates a top plan view of another embodiment of the present disclosure which provides an alignment device.
Figure 21:
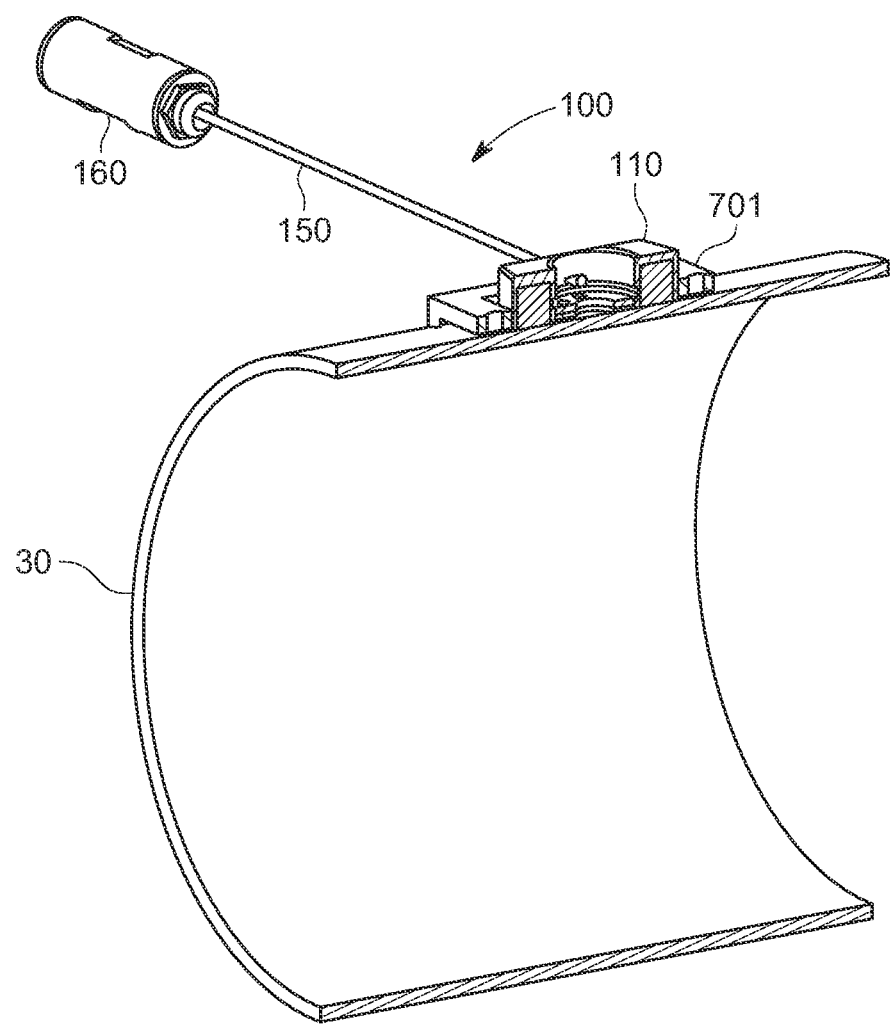
FIG. 21 illustrates a perspective cross-sectional view of the ultrasonic patch transducer, the structural asset and the alignment device.

Attention is directed to FIG. 20, which illustrates the alignment device 801 which may be used in connection with the ultrasonic patch transducer 600 shown in FIGS. 15 and 16. The alignment device 801 is preferably identical to the alignment device 700, except that the through-hole 807 is sized to accommodate the housing 612 of the ultrasonic patch transducer 600, rather than the housing 112, 312, 512 of the ultrasonic patch transducer 100, 200, 200', 300, 500. The housing 612 of the ultrasonic patch transducer 600 is not an elongated structure, but rather is symmetrical about more than one centerline, e.g., centerline C5 (which extends in a first direction) and centerline C6 (which extends in a second direction, which is orthogonal to the first direction). The through-hole 807 thus preferably has a circular cross-section, but may have any other suitable cross-section, such as square, hexagonal, octagonal, etc. (to match the cross-section of the housing 612).

As discussed above, the ultrasonic patch transducer 600 is not self-aligning (no magnets provided and not elongated) and, therefore, except in certain circumstances where alignment is not important, it is advantageous to use the alignment device 801 in order to properly position and mount the ultrasonic patch transducer 600 to the structural asset 30. In operation, the alignment device 801 is positioned in a lengthwise direction along a length of the structural asset 30 such that each of the magnets 713a, 713b are both positioned along a tangent plane of the structural asset 30. As the magnets 713a, 713b are both positioned along a tangent plane of the structural asset 30, the alignment device 801 is thus properly positioned/aligned such that the housing 612 of the ultrasonic patch transducer 600 can likewise be properly positioned/aligned. Furthermore, the third lower angled wall surfaces, respectively, of the walls 709a, 709b of the alignment device 801 further act to properly position/align the alignment device 801 along the structural asset 30. With the alignment device 801 properly positioned/aligned, the couplant 170 is applied to the lower surface of the sensor assembly 510 of the ultrasonic patch transducer 600 (or to the portion of the outer surface of the structural asset 30 that is accessible via the through-hole 807 of the alignment device 801) and the sensor assembly 510 of the ultrasonic patch transducer 600 is then positioned within the through-hole 807 of the alignment device 801. In order to properly align the sensor assembly 510 of the ultrasonic patch transducer 600 within the through-hole 807 (such that the piezoelectric element 514 of the ultrasonic patch transducer 600 and the sensor 518 of the ultrasonic patch transducer 600 will both be properly positioned/aligned along the tangent plane of the structural asset 30), the aperture 634 of the housing 612 is aligned with the slot 731). As a result, the housings 612, 801 temporarily form a two-part housing in that the housings 612, 801 form a first housing part and the housing 701 forms a second housing part. When the couplant 170 is cured, the sensor assembly 510 of the ultrasonic patch transducer 600 will then be secured to the structural asset 30 and the alignment device 801 can be removed from the structural asset 30 and reused to mount other ultrasonic patch transducers 600 to the same or different structural asset 30.

In certain instances, the structural asset 30 to which the ultrasonic patch transducer 600 is to be mounted (for condition monitoring), may not be magnetic (identified herein as non-magnetic structural asset 30'). In such instances, the alignment device 801 will aid in the proper alignment/positioning of the ultrasonic patch transducer 600 to the non-magnetic structural asset 30'. In operation, the alignment device 801 is positioned in a lengthwise direction along a length of the non-magnetic structural asset 30' such that the third lower angled wall surfaces, respectively, of the walls 709a, 709b of the alignment device 801 sit against the outer wall of the non-magnetic structural asset 30', thus acting to properly position/align the alignment device 801 along the non-magnetic structural asset 30'. Once the alignment device 801 is properly positioned/aligned along the non-magnetic structural asset 30', straps 751a, 751b are wrapped around the non-magnetic structural asset 30' and the alignment device 801, with the strap 751a being positioned within the groove 729a, and the strap 715b being positioned within the groove 729b, to thereby hold the alignment device 801 in place (essentially clamping the alignment device 801 against the non-magnetic structural asset 30'). With the alignment device 801 properly positioned/aligned, the couplant 170 is applied to the lower surface of the sensor assembly 510 (or to the portion of the outer surface of the non-magnetic structural asset 30' that is accessible via the through-hole 807 of the alignment device 801) and the sensor assembly 510 is then positioned within the through-hole 807 of the alignment device 801 (as the through-hole 807 and the housing 612 both have elongated lengths, this ensures that the piezoelectric element 514 and the sensor 518 will be properly positioned/aligned along the tangent plane of the non-magnetic structural asset 30'). When the couplant 170 is cured, the sensor assembly 510 will then be secured to the non-magnetic structural asset 30' and the alignment device 801 can be removed from the non-magnetic structural asset 30' (by first releasing/removing the straps 751a, 751b) and reused to mount other ultrasonic patch transducers 600 to the same or different structural asset 30, 30'. The cable assembly 550 of the ultrasonic patch transducer 600 is positioned within (or more likely above) the slot 731, such that the alignment device 801 can be removed when desired.

Where the alignment device 801 is used in connection with the ultrasonic patch transducer 600 and a magnetic structural asset 30, the grooves 729a, 729b are not utilized and, as such, an alignment device 801 that is to be utilized only with the ultrasonic patch transducer 600 can be manufactured without the grooves 729a, 729b. However, if the alignment device 801 is used as a universal alignment device for use with magnetic and non-magnetic structural assets 30, 30', there is no harm in the alignment device 801 having these features despite them not being used.

Where the alignment device 801 is used in connection with the ultrasonic patch transducer 600 and a non-magnetic structural asset 30', the magnets 713a, 713b are not utilized and, as such, an alignment device 801 that is to be utilized only with ultrasonic patch transducer 600 on non-magnetic structural assets 30' can be manufactured without the magnets 713a, 713b. However, if the alignment device 801 is used as a universal alignment device for use with magnetic and non-magnetic structural assets 30, 30', there is no harm in the alignment device 801 having these features despite them not being used.

Figure 24:
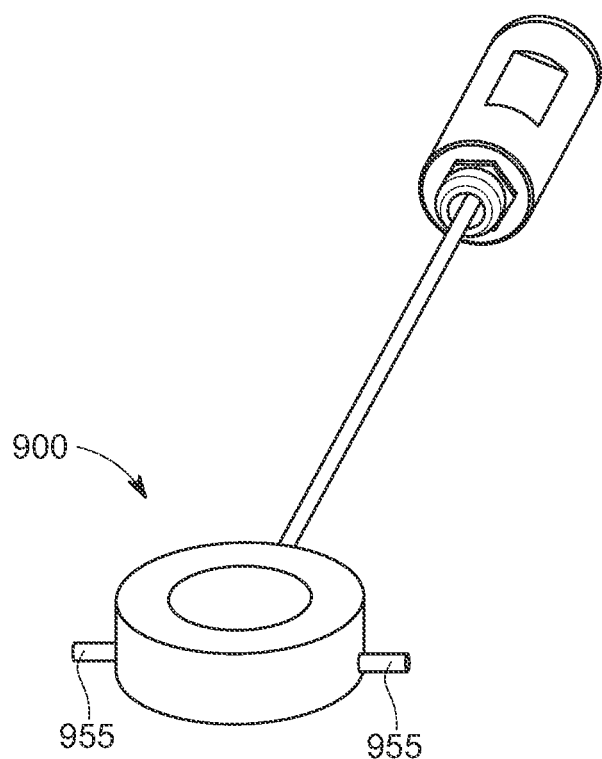
FIG. 24 illustrates a perspective view of a sixth embodiment of the present disclosure which provides an ultrasonic patch transducer.
Figure 25:
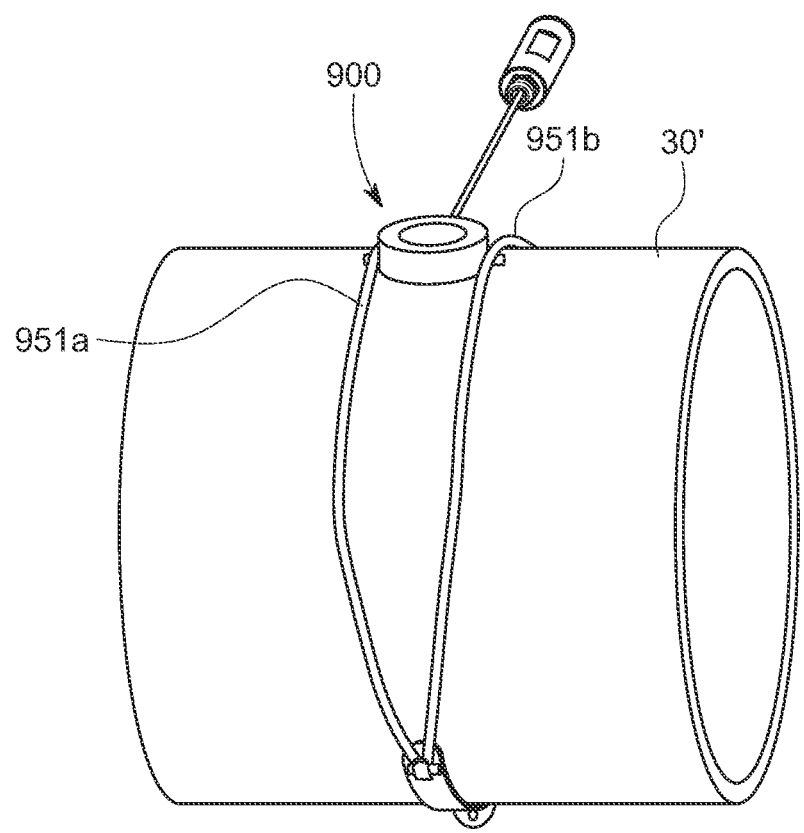
FIG. 25 illustrates a perspective view of the ultrasonic patch transducer of FIG. 21 secured to a structural asset by straps.

Attention is directed to FIGS. 24 and 25, which illustrate a sixth embodiment of the present disclosure which provides a self-aligning ultrasonic patch transducer 900, which may be designed for high temperature applications, e.g., applications of at least 200° C. Ultrasonic patch transducer 900 is identical to ultrasonic patch transducer 600, except that ultrasonic patch transducer 900 is also provided with a pair of mounting ears 955. The mounting ears 955 extend outwardly, in opposite directions, from the outer side surface 635 of the housing 612. The mounting ears 955 extend along or parallel to the centerline C3 and are in alignment with both the piezoelectric element 514 and the sensor 518. The mounting ears 955 are preferably cylindrical in configuration, but may have any suitable configuration (including providing an inner reduced portion between an outer enlarged portion and the outer side surface 635 of the housing 612). The mounting ears 955 are preferably positioned more proximate to the lower surface 526 of the housing 612 than to the upper surface 528 of the housing 612, but the mounting ears 955 preferably never extend to as low as the lower surface 526.

In operation, the ultrasonic patch transducer 900 will work in the same manner as ultrasonic patch transducer 600, but as the ultrasonic patch transducer 900 includes the mounting ears 955, the ultrasonic patch transducer 900 is self-aligning on non-metallic structural assets 30' (as the mounting ears 955 are positioned along an axial direction of the structural asset 30' and as no magnets are provided in ultrasonic patch transducer 900). Despite ultrasonic patch transducer 900 being self-aligning, ultrasonic patch transducer 900 must still be secured in place. Once the ultrasonic patch transducer 900 is properly positioned/aligned along the non-magnetic structural asset 30' (which includes having couplant 170 applied to the lower surface of the ultrasonic patch transducer 900), straps 951a, 951b are wrapped around the non-magnetic structural asset 30' and the mounting ears 955, to thereby hold the ultrasonic patch transducer 900 in place (essentially clamping the ultrasonic patch transducer 900 against the non-magnetic structural asset 30'). When the couplant 170 is cured, the ultrasonic patch transducer 900 will then be secured to the non-magnetic structural asset 30' and the straps 951a, 951b can be released/removed.

It should be noted that while the mounting ears 955 are described and illustrated in connection with ultrasonic patch transducer 600, the mounting ears 955 could also be used in connection with ultrasonic patch transducer 100, 200, 200', 300, 500.

Figure 27:
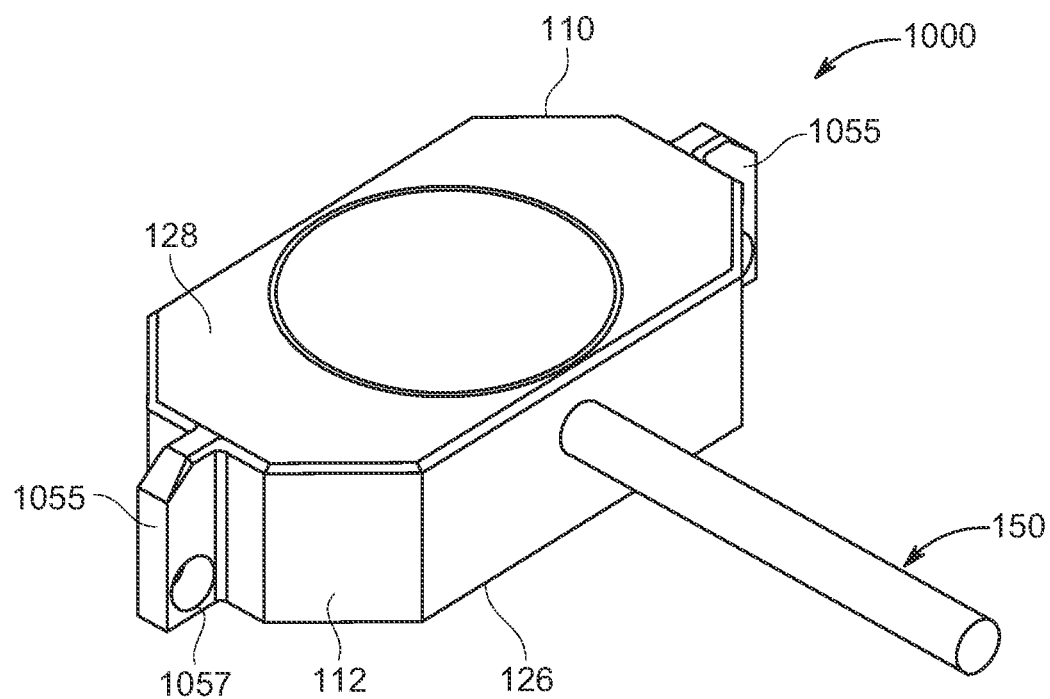
FIG. 27 illustrates a perspective view of a seventh embodiment of the self-aligning ultrasonic patch transducer.
Figure 28:
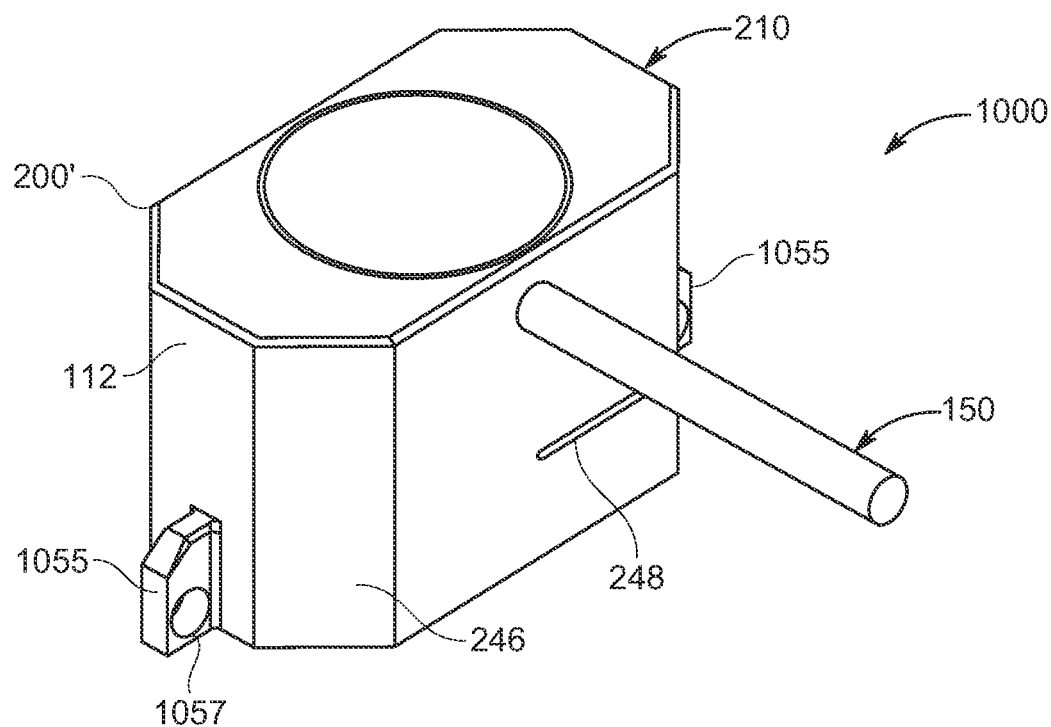
FIG. 28 illustrates a perspective view of an alternate seventh embodiment of the self-aligning ultrasonic patch transducer.

Attention is directed to FIG. 27 and 28 which illustrates a seventh embodiment of the present disclosure which provides a self-aligning ultrasonic patch transducer 1000, which may be designed for high temperature applications, e.g., applications of at least 200° C., and for use with the non-magnetic structural asset 30'. Ultrasonic patch transducer 1000 is identical to ultrasonic patch transducer 100, except that the ultrasonic patch transducer 1000 is also provided with a pair of mounting ears 1055. The mounting ears 1055 extend outwardly, in opposite directions, from the housing 112. The mounting ears 1055 extend along or parallel to the centerline C1 sand are in alignment with both the piezoelectric element 114 and the sensor 118. Each mounting ear 1055 has an opening 1057 therethrough which extends in the second direction. The openings 1057 are preferably positioned more proximate to the lower surface 126 of the housing 112 than to the upper surface 128 of the housing 112. A lower end of each mounting ear 1055 may be planar with the lower surface 126.

In operation, the ultrasonic patch transducer 1000 will work in the same manner as ultrasonic patch transducer 100, but as the ultrasonic patch transducer 1000 includes the mounting ears 1055, the ultrasonic patch transducer 1000 is self-aligning on non-metallic structural assets 30' (as the mounting ears 1055 are positioned along an axial direction of the structural asset 30'). Despite ultrasonic patch transducer 1000 being self-aligning, ultrasonic patch transducer 1000 must still be secured in place. Once the ultrasonic patch transducer 1000 is properly positioned/aligned along the non-magnetic structural asset 30' (which includes having couplant 170 applied to the lower surface of the ultrasonic patch transducer 1000), straps such as those shown as straps 951a, 951b are wrapped around the non-magnetic structural asset 30' and through the openings 1057 in the mounting ears 1055, to thereby hold the ultrasonic patch transducer 1000 in place (essentially clamping the ultrasonic patch transducer 1000 against the non-magnetic structural asset 30'). When the couplant 170 is cured, the ultrasonic patch transducer 1000 will then be secured to the non-magnetic structural asset 30' and the straps can be released/removed.

It should be noted that while the mounting ears 1055 are described and illustrated in connection with ultrasonic patch transducer 1000, they could also just as easily be used in connection with ultrasonic patch transducer 100, 200, 200', 300, 500, 600. The mounting ears 1055 are shown for use with ultrasonic patch transducer 200' in FIG. 24.

While the steel block 24 is shown and described with regard to the standardization ultrasonic patch transducer 200 of the second embodiment, the steel block 24 can be provided for us with any of the other embodiments of the ultrasonic patch transducer 300, 400, 500, 600, 900, 1000 for standardization purposes.

Those embodiments having elongated configurations aid in proper alignment of the ultrasonic patch transducer along a length of the structural asset as there will not be any "wobble" as is experienced when ultrasonic transducers having other configurations, e.g., circular, which then include circular/ring magnets, are provided along an outer surface of the structural asset. Further, as the proper alignment ensures the close contact between the piezoelectric element and the structural asset, the sensor provides more accurate measurements on the conditions, e.g., thickness, of the structural asset. Furthermore, the design of the ultrasonic patch transducer allows for the ultrasonic patch transducer to have a compact/small form factor which can then be positioned at most of structural asset. More specifically, a single-element ultrasonic patch transducer can be utilized on any structural asset that has an outer diameter of three (3) inches or greater. An ultrasonic patch transducer having a still smaller form factor would preferably be used for structural assets that have an outer diameter of less than three (3) inches.

The magnet assemblies provide mechanical fixture and alignment (perpendicular to the outer surface of the structural asset) during the curing of the epoxy adhesive. The size, orientation and number of magnets included in the magnet assemblies is driven by cost, adequate coupling force, and alignment stability for flat as well as curved surfaces. Furthermore, the orientation of magnets may be adjustable to achieve the maximum magnetic flux within the alignment device to improve the alignment and hold the ultrasonic patch transducer in place during curing.

In an alternative embodiment, the ultrasonic patch transducers 100, 200, 200', 300 may be configured (with minor modifications to the housing 112) to allow the magnet assembly 116 to be removable from the housing 112 after the couplant 170 has been cured as the primary purpose of the magnet assembly 116 is to provide securement and alignment of the ultrasonic patch transducer 100 while the couplant 170 is cured. As such, once the couplant 170 is cured, the magnet assembly 116 is no longer required for securement and alignment purposes. Thus, in such cases where the magnet assembly 116 is removable, it can then be reused in association with the securement/alignment of another ultrasonic patch transducer 100, thereby further reducing cost and resources.

While the cable assembly 150, 350, 550 is described as being potted, the ultrasonic patch transducer 100, 200, 200', 300, 500, 600 can be modified such that the cable assembly 150, 350, 550 can be detachable from the PCB 120, 520.

In an alternative embodiment of the ultrasonic patch transducer, the couplant may be a metal foil and special mechanical clamp assembly that is used to provide adequate pressure. The metal foil may be any suitable material such as, for instance, silver, copper, gold or tin. In such an embodiment, the magnetic assembly is replaced by the mechanical clamp assembly.

In an alternative embodiment of the ultrasonic patch transducer, if the housing is formed of a magnetic material, the magnet assembly may not be required as the housing itself can secure the ultrasonic patch transducer to the structural asset as required, or the housing can work in conjunction with the magnet assembly to secure the ultrasonic patch transducer to the structural asset as required (and this latter embodiment may help concentrate the flux from the magnets). Further, having the housing formed of a magnetic material is important when gravity is not working with the user who is trying to secure the ultrasonic patch transducer in place.

In an alternative embodiment, instead of providing the slot 731, the alignment device 700, 801 could be provided with a groove on a lower surface of the wall 709b so as to accommodate the cable assemblies 150, 350, 550, yet still allow the alignment devices 700, 801 to be removed when desired. In such instances, an indicator (such as an arrow) could be provided on an upper surface of the wall 709b to assist in proper alignment.

In an alternative embodiment, multiple piezoelectric elements may be included within a single ultrasonic patch transducer (and thus positioned within the housing). In such an embodiment, the housing would preferably be provided with multiple first lower portions, one for each piezoelectric element. In such an embodiment with multiple piezoelectric elements, it is preferable to also have a sensor (e.g., an RTD) operatively associated with a respective one of the piezoelectric elements, and thus the housing would preferably be provided with multiple second lower portions, one for each sensor. Each piezoelectric/sensor set is also preferably positioned along the centerline C1 of the housing such that they are each positioned along the same tangent plane of the outer surface of the structural asset 30.

In an embodiment where multiple sensors are provided in the ultrasonic patch transducer, the multiple sensors can be the same type of sensor, e.g., an RTD, or the multiple sensors can be different types of sensors, e.g., an RTD and a vibration sensor, or an RTD and a gas sensor.

In an alternative embodiment, where multiple ultrasonic patch transducers are used together to monitor a single asset (e.g., as illustrated in FIG. 5), each ultrasonic patch transducer may utilize a common ID/communication board, as opposed to each ultrasonic patch transducer utilizing its own ID/communication board.

It should also be noted that, if desired, the undercut portion 138 described and illustrated in connection with ultrasonic patch transducer 100, could also be utilized in any of ultrasonic patch transducers 200, 200', 300, 400, 500, 600, 900 as desired.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims. Further, the foregoing descriptions describe methods that recite the performance of a number of steps. Unless stated to the contrary, one or more steps within a method may not be required, one or more steps may be performed in a different order than as described, and one or more steps may be formed substantially contemporaneously. Finally, the drawings are not necessarily drawn to scale.

We claim:

1. An ultrasonic patch transducer configured to be secured to an outer surface of a structural asset, the ultrasonic patch transducer comprising:
    an elongated housing having a length greater than a width, the elongated housing defining a centerline extending lengthwise between a first end of the elongated housing and a second end of the elongated housing;
    a single-element piezoelectric element within the elongated housing and positioned along the centerline; and
    at least two magnets within the elongated housing and positioned along the centerline,
    wherein the at least two magnets are configured to cause the elongated housing to be self-aligning to be positioned such that the length and the width of the elongated housing extend perpendicular to each other along a tangent plane of the structural asset and secure the ultrasonic patch transducer to the structural asset such that the centerline of the elongated housing is aligned with a direction of flow of the structural asset.

2. The ultrasonic patch transducer of claim 1, further comprising:
    a sensor within the elongated housing and positioned along the centerline; and
    a printed circuit board within the elongated housing, the piezoelectric element and the sensor being coupled with the printed circuit board.

3. The ultrasonic patch transducer of claim 2, wherein the ultrasonic patch transducer comprises a plurality of single-element piezoelectric elements and the ultrasonic patch transducer further comprises a plurality of sensors provided within the elongated housing and coupled with the printed circuit board.

4. The ultrasonic patch transducer of claim 2, further including a potting material within the elongated housing, wherein the printed circuit board and the potting material are within a hole in the elongated housing, and wherein a wall forming the hole has an undercut therein, the undercut being above the printed circuit board, wherein the potting material fills the undercut and the hole above the printed circuit board.

5. The ultrasonic patch transducer of claim 2, further comprising a cable coupled to the printed circuit board, and an ID/communication board coupled to the cable.

6. The ultrasonic patch transducer of claim 2, further comprising a steel block positioned underneath the piezoelectric element and the sensor, wherein the at least two magnets extend through bores in the steel block.

7. The ultrasonic patch transducer of claim 6, wherein the steel block and the elongated housing are integrally formed.

8. The ultrasonic patch transducer of claim 6, wherein the steel block includes a pair of mounting ears extending outwardly therefrom which are configured to engage with straps, the mounting ears being positioned along the centerline.

9. The ultrasonic patch transducer as defined in claim 2, wherein the sensor is a resistance temperature detector.

10. The ultrasonic patch transducer as defined in claim 2, wherein the piezoelectric element and the sensor are positioned between two of the magnets.

11. The ultrasonic patch transducer of claim 1, wherein the elongated housing is formed of a first housing part and a second housing part, the first housing part seating within a through-hole in the second housing part, and wherein the first and second housing parts can be separated.

12. The ultrasonic patch transducer of claim 11, wherein the magnets are within the first housing part.

13. The ultrasonic patch transducer of claim 11, wherein the magnets are within the second housing part.

14. The ultrasonic patch transducer of claim 11, wherein the second housing part includes a pair of angled surfaces which are configured to engage with an outer diameter of the structural asset.

15. The ultrasonic patch transducer of claim 11, wherein the second housing part has a first groove forward of the through-hole and a second groove rearward of the through-hole, each groove being configured to be engaged by a strap.

16. The ultrasonic patch transducer of claim 15, wherein each groove extends in a transverse direction to the centerline.

17. The ultrasonic patch transducer of claim 11, further comprising:
    a sensor within the elongated housing and positioned along the centerline;
    a printed circuit board within the elongated housing, the piezoelectric element and the sensor being coupled with the printed circuit board;
    a cable coupled to the printed circuit board;
    an ID/communication board coupled to the cable; and
    wherein the elongated housing has a slot extending from the through-hole and through which the cable extends.

18. The ultrasonic patch transducer of claim 1, wherein one of the magnets is forward of the piezoelectric element and another one of the magnets is rearward of the piezoelectric element.

19. The ultrasonic patch transducer of claim 1, wherein the ultrasonic patch transducer comprises a plurality of single-element piezoelectric elements provided within the elongated housing.

20. The ultrasonic patch transducer of claim 1, wherein the elongated housing includes a pair of mounting ears extending outwardly therefrom which are configured to engage with straps, each mounting ear extending in a direction along or parallel to the centerline.

21. A method comprising:
- providing an ultrasonic patch transducer including an elongated housing having a length greater than a width, the elongated housing defining a centerline between a first end of the elongated housing and a second end of the elongated housing, a single-element piezoelectric element within the elongated housing and positioned along the centerline, and at least two magnets within the elongated housing and positioned along the centerline;
- applying a couplant to a bottom surface of the ultrasonic patch transducer; and
- positioning the elongated housing on an outer diameter of a structural asset such that each magnet engages the structural asset to self-align the elongated housing such that the length and the width of the elongated housing extend perpendicular to each other along a tangent plane of the structural asset, the elongated housing generally aligned lengthwise along an axial centerline of the structural asset.

* * * * *